United States Patent
McGowan

(10) Patent No.: US 10,095,653 B2
(45) Date of Patent: Oct. 9, 2018

(54) APPARATUSES, SYSTEMS, AND METHODS FOR ACCURATELY MEASURING PACKET PROPAGATION DELAYS THROUGH USB RETIMERS

(71) Applicant: Intel Corporation, Santa Clara, CA (US)

(72) Inventor: Steven B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 15/089,531

(22) Filed: Apr. 2, 2016

(65) Prior Publication Data

US 2017/0286359 A1  Oct. 5, 2017

(51) Int. Cl.
  *G06F 13/42* (2006.01)
  *G06F 13/16* (2006.01)
  *H04L 9/32* (2006.01)
  *G06F 13/36* (2006.01)
  *H04L 25/02* (2006.01)

(52) U.S. Cl.
  CPC ...... *G06F 13/4291* (2013.01); *G06F 13/1673* (2013.01); *G06F 13/4295* (2013.01); *H04L 9/3297* (2013.01); *G06F 13/36* (2013.01); *H04L 25/0298* (2013.01)

(58) Field of Classification Search
  CPC ... H04L 25/0298; G06F 13/36; G06F 13/4291
  See application file for complete search history.

(56) References Cited

U.S. PATENT DOCUMENTS

| | | | |
|---|---|---|---|
| 2011/0058433 A1* | 3/2011 | Choi | G11C 7/22 365/194 |
| 2015/0378952 A1 | 12/2015 | Chen et al. | |
| 2017/0185547 A1* | 6/2017 | McGowan | G06F 13/36 |

OTHER PUBLICATIONS

"Universal Serial Bus 3.1 Specification," Repeaters, Revision 1.0, 20 pages.
"Universal Serial Bus 3.1 Specification," Revision 1.0, Jul. 26, 2013, 631 pages.

* cited by examiner

*Primary Examiner* — Tammara R Peyton
(74) *Attorney, Agent, or Firm* — Nicholson De Vos Webster & Elliott LLP

(57) ABSTRACT

Methods and apparatuses relating to measuring propagation delays through USB retimers are described. In one embodiment, a retimer apparatus includes a receiver to receive a data block and a timestamp for the data block from an upstream device, a buffer to store the data block and the timestamp for transmittal, a controller to modify the timestamp to generate a modified timestamp that includes a time from a receipt of a first portion of the data block in the buffer until a transmittal of the first portion of the data block from the buffer, and a transmitter to transmit the data block and the modified timestamp to a downstream device.

24 Claims, 18 Drawing Sheets

APPARATUSES, SYSTEMS, AND METHODS FOR ACCURATELY MEASURING PACKET PROPAGATION DELAYS THROUGH USB RETIMERS

TECHNICAL FIELD

The disclosure relates generally to electronics, and, more specifically, an embodiment of the disclosure relates to a Universal Serial Bus (USB) retimer circuit.

BACKGROUND

Electronics (e.g., computer systems) generally employ one or more electrical connections to facilitate the transmittal of data (e.g., communication) between devices, such as between a computing system and a (e.g., external) peripheral.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
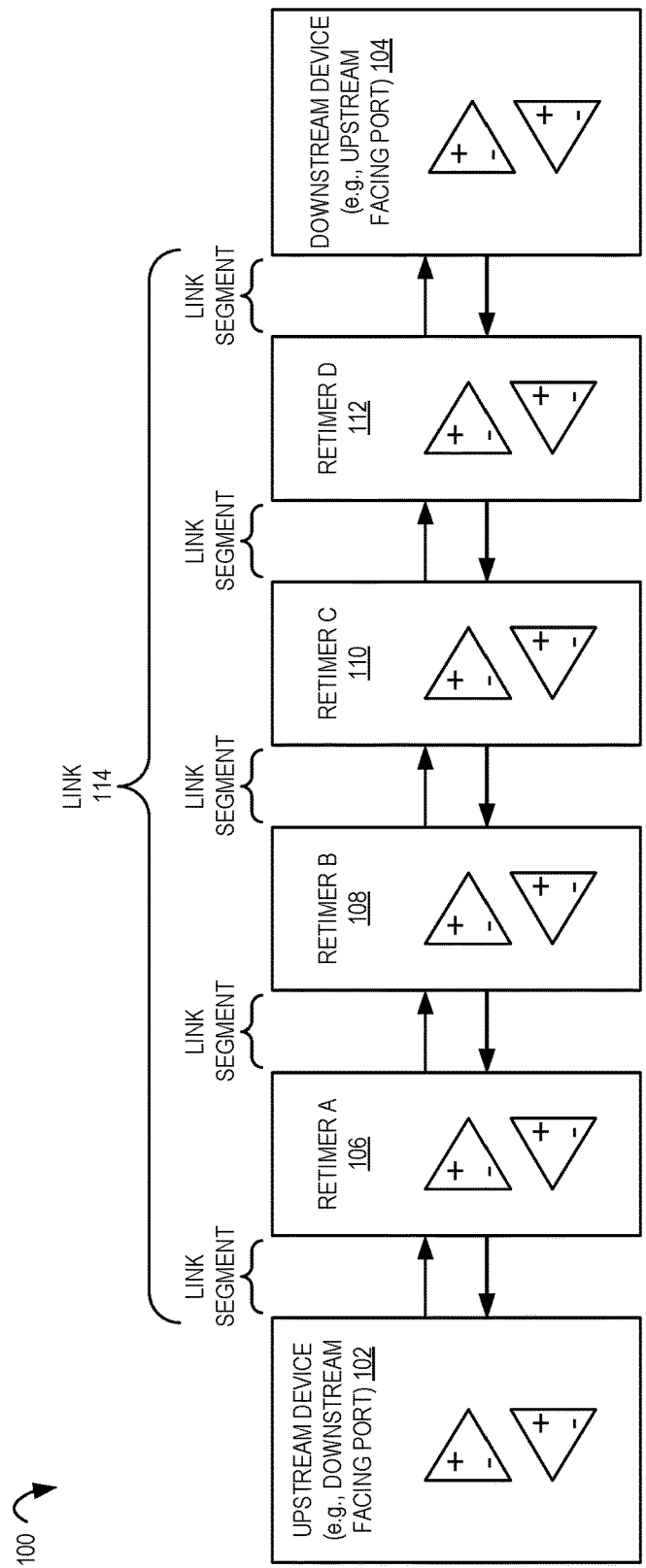
FIG. 1 illustrates a schematic diagram of a circuit including an upstream device coupled to a downstream device through a plurality of retimers according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Electronics (e.g., computing systems) generally employ one or more electrical connections (e.g., a bus or interconnect) to facilitate the transmittal of data (e.g., communication) between devices, such as, but not limited to, between a computing system (e.g., a computer including a hardware processor) and a (e.g., external) peripheral. Non-limiting examples of peripherals are external storage devices (e.g., hard disk drives) and mobile devices (e.g., smartphones and tablets).

Certain electrical connections (e.g., couplings) include parallel conductors (e.g., parallel wires or other electrically conductive paths). One embodiment of an electrical connection is a bus. One embodiment of a bus is a multiple conductor parallel bus, for example, where the conductors allow parallel (e.g., concurrent) transmittal of data thereon. The term electrical connection (e.g., interconnect or bus) may generally refer to one or more separate physical connections, communication lines and/or interfaces, shared connections, and/or point-to-point connections, which may be connected by appropriate bridges, hubs, adapters, and/or controllers.

The phrase Universal Serial Bus (USB) generally refers to a cable bus that supports the transmittal of data (e.g., and power) between a USB host (e.g., host) and a one or more USB devices (e.g., peripherals or peripheral devices). In one embodiment, a USB device does not include a USB host or USB hub. A USB cable is generally used to make the electrical connection between the USB host or hub and the USB device, e.g., with one or more hubs therebetween. A USB controller may be part of a USB host (e.g., host circuit) or device (e.g., device circuit) and/or included as a component separate from the USB host (e.g., host circuit) of device (e.g., device circuit). Certain communication specifications (e.g., standards), for example, the USB specifications, may include the protocols for electronic devices to communicate with each other. For example, the USB 3.1 specification includes Precision Time Management (PTM). PTM is to enable USB devices to have a precise notion of time by providing a method of precisely characterizing link delays and the propagation delays through a hub (e.g., not a retimer). A link generally refers to the connection between two ports. A port generally refers to a point of access to or from a system or circuit. In one embodiment, PTM capability is discovered (e.g., by software or hardware) through a PTM Capability Descriptor. Precision time measurement generally consists of two separate mechanisms: Link Delay Measurement (LDM) and Hub Delay Measurement (HDM). These mechanisms may complement each other to provide highly accurate bus interval boundary timing for devices. HDM may be used to improve device bus interval boundary timing accuracy even if LDM timing information is not available, or vice versa. For example, USB SuperSpeedPlus hosts and hubs currently are required to support PTM. PTM support may be optional for peripheral devices and/or SuperSpeed only hosts and hubs. In one embodiment, PTM is supported by all components of a USB topology; e.g., PTM capable hubs are to improve the overall accuracy of a device's notion of the bus interval boundary timing. In one embodiment, if a device supports PTM, it is required to support LDM.

One embodiment of an LDM Link Delay circuit identifies the delay between the first portion (e.g., symbol) of a data block (e.g., packet) being transmitted on a (e.g., responder's) downstream facing port and the first portion (e.g., symbol) of the same data block (e.g., packet) being received on the (e.g., requester's) upstream facing port. In a hub or device, for example, the LDM Link Delay may be determined from timestamp exchanges with its upstream responder. In one embodiment, data and control bytes or characters are encoded into a symbol, e.g., using an 8 bits(b)/10b or 128b/132b encoding. In one embodiment, a header or block identifier (e.g., 4 bits) is prepended to a group of symbols (for example, 16 symbols, e.g., 128 bits) to create a data block (e.g., a 132 bit data block, which may be referred to as 128b/132b encoding). In certain embodiments, a packet generally refers to a section of data and control bytes (e.g., symbols), for example, a 4-bit block identifier (e.g., header or framing symbol) and a 16 byte payload of data. In certain embodiments, a packet is multiple data blocks. In one embodiment, LDM (e.g., an LDM circuit or controller) is to determine the delay caused by a link (e.g., not caused by a retimer or hub). For example, a (e.g., tITDFP) first timestamp may represent the time that a PTM downstream facing port transmits an Isochronous Timestamp Packet (ITP) and a (e.g., tITUFP) second timestamp may represent the time that a PTM upstream facing port receives the ITP. The difference between the first and second timestamps thus may indicate the LDM Link Delay (see, e.g., Link Delay 1 and 2 in FIGS. 2-6). In one embodiment, a hub and a retimer are separate devices. A hub generally refers to a USB device that provides additional connections to the USB circuit, e.g., to expand a single USB port into a plurality of ports to connect a plurality of devices to a host. In certain embodiments of a USB system, a hub is visible and a retimer is not visible (e.g., visible to software running on the host and/or device). In certain embodiments, a hub has three or more ports (e.g., two or more downstream facing ports and one upstream facing port) and a retimer only has two ports (e.g., one downstream facing port and one upstream facing port).

A (e.g., USB) data circuit to transmit and/or receive data (e.g., a data set) may include a repeater. A repeater generally refers to an active component that acts on a signal in order to increase the physical lengths and/or interconnect loss over which the signal can be transmitted successfully. The category of repeaters may include both retimers and re-drivers. A retimer generally refers to a (e.g., hardware) component that contains a clock-data recovery (CDR) circuit that "retimes" the signal (e.g., data). The retimer may latch the signal into a synchronous memory element before re-transmitting it. A retimer may be used to extend the physical length of the system, for example, without accumulating (e.g., high frequency) jitter by separate clock domains on either side of the retimer. A re-driver generally refers to an analog component that operates on the signal without re-timing it. This may include equalization, amplification, and transmission. In one embodiment, the re-driver does not include a CDR. A device captive retimer generally refers to a retimer that is located on the same (e.g., printed) circuit board as the device silicon. The retimer may be said to be associated with the device. A host captive retimer generally refers to a retimer that is located on the same (e.g., printed) circuit board as the host silicon. In this case, the retimer may be said to be associated with the host. A link segment generally refers to a transmitter-channel-receiver combination between a downstream port and a retimer, an upstream port and a retimer, or between two retimers. Examples of this are demonstrated in FIG. 1.

FIG. 1 illustrates a schematic diagram of a circuit 100 including an upstream device 102 (e.g., a downstream facing port) coupled to a downstream device 104 (e.g., an upstream facing port) through a plurality of retimers (A-D) according to embodiments of the disclosure. Although four retimers are illustrated, there may be a single retimer or any number of retimers depending on the system configuration. The upstream device 102 (e.g., a downstream facing port) and the downstream device 104 (e.g., an upstream facing port) may each include USB 3.1 ports. The upstream device 102 (e.g., a downstream facing port) may be a hub or host of a USB system. The downstream device 104 (e.g., an upstream facing port) may be a hub or peripheral of a USB system including this USB configuration. A retimer 106, a retimer 108, a retimer 110, and a retimer 112 are depicted between the upstream device 102 (e.g., a downstream facing port) and the downstream device 104 (e.g., an upstream facing port). A link 114 (e.g., with link segments between pairs of components) is depicted connecting the upstream device 102 (e.g., a downstream facing port) and the downstream device 104 (e.g., an upstream facing port). An upstream device 102 (e.g., a downstream facing port), downstream device 104 (e.g., an upstream facing port), a retimer, or any combination thereof, may include a receiver to receive data and/or a transmitter to send data. This is shown schematically in FIG. 1. Although a single receiver and transmitter (e.g., in a transceiver circuit) are shown in each component, a plurality of transmitters and/or receivers may be utilized in each component (e.g., in each host, retimer, or device). Although a single arrow is shown for each direction of link, the number of conductors (e.g., channels) may be a plurality. For example, USB 3.1 may include one or more of the following data signals (e.g., on a respective conductor or channel) SuperSpeed transmit plus (SSTx+), SuperSpeed transmit minus (SSTx−), SuperSpeed receive plus (SSRx+), and SuperSpeed receive minus (SSRx−). As noted above, data signals (e.g., data blocks or data packets) traveling along a link or link segment may have delays and/or a reduced amplitude, e.g., resulting in signal attenuation and jitter. As illustrated in FIG. 1, the retimer 106, the retimer 108, the retimer 110, and the retimer 112 may each analyze and alter the (e.g., timing of the) signal to prevent signal deterioration (e.g., owing to a delay) between components, e.g., upstream device 102 (e.g., a downstream facing port) and the downstream device 104 (e.g., an upstream facing port). In one embodiment, one retimer is situated at the host, another retimer is situated at the device, and two retimers are situated at each end of a cable that is to connect the host and the device (e.g., peripheral). In certain embodiments, a retimer at the host may be located on the host circuit board (e.g., motherboard), with the retimer at the device located on the device circuit board, and two retimers in the cable that connects the host and the device. A cable may generally refer to a raw cable with no plugs attached. A cable assembly may generally refer to a cable with plugs attached. A component (e.g., a USB host or device) may include a receptacle, e.g., to connect to a plug.

As the current USB 3.1 spec defines LDM, it does not comprehend retimers. So when a downstream device (e.g., downstream device 104 in FIG. 1) measures the link delay, it is measuring the delay to the downstream facing port 102 across link 114. The LDM measurement requires the delay across the link 114 to be constant and symmetric. However, each retimer in the path introduces a variable, asymmetric delay, which breaks the LDM measurement.

Figure 2:
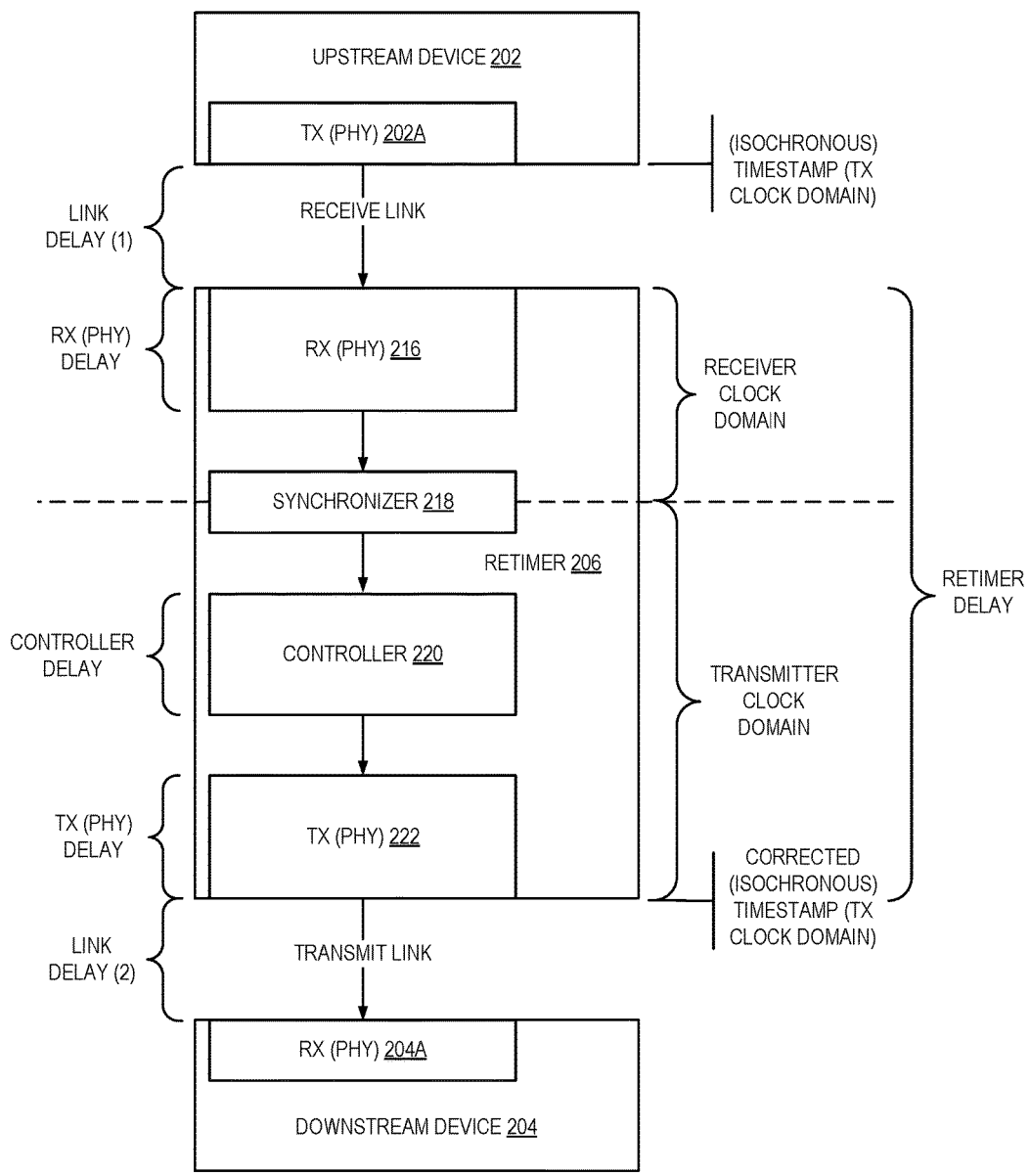
FIG. 2 illustrates a schematic diagram of a circuit including an upstream device coupled to a downstream device through a retimer according to embodiments of the disclosure.

FIG. 2 illustrates a schematic diagram of a circuit 200 including an upstream device 202 coupled to a downstream device 204 through a retimer 206 according to embodiments of the disclosure. Depicted upstream device 202 (e.g., bus host) includes a transmitter 202A (e.g., as part of a transceiver circuit (physical layer (PHY)) and may also include a receiver. Depicted downstream device 204 (e.g., bus device) includes a receiver 204A (e.g., as part of a transceiver circuit (physical layer (PHY)) and may also include a transmitter. Retimer 206 includes a receiver 216 to receive data (e.g., data block or data packet) from the upstream device 202 and a transmitter 222 to transmit the corrected (e.g., retimed) data signal to the downstream device 204. Retimer 206 further includes a synchronizer 218 (e.g., circuit), e.g., to synchronize data received in a first clock domain (e.g., clock domain of the receiver 216) with a second clock domain (e.g., clock domain of the transmitter 222). In one embodiment, a data signal (for example, a data block or data packet with a (e.g., single) timestamp field included therein) has a timestamp associated with the data signal. A timestamp may be the time that an upstream device 202 (e.g., a host) transmitted the data signal (e.g., the first portion of the data block or data packet). A time (e.g., timestamp) in a first time domain (e.g., receiver 216 time domain of retimer 206) may be included in the data signal. Synchronizer may convert the data signal from the first time domain (e.g., receiver 216 time domain of retimer 206) to a second time domain (e.g., transmitter 222 time domain of retimer 206). Synchronizer 218 does not modify (e.g., add or subtract) a time (e.g., a timestamp) for any delay introduced by components and/or links. In certain embodiments, a receiver (Rx) and a transmitter (Tx) run with independent clock domains, e.g., with a synchronizer between them to pass received data from one clock domain to the other. In FIG. 2, the retimer's receiver clock domain stretches across the link to the transmitter 202A. The 202A transmitter clock is used to transmit the data, and the receiver 216 recovers that clock so both are working with the same clock. In FIG. 2, the retimer's transmitter clock domain stretches across the link to the receiver 204A. In this case, the receiver and transmitter clock domains are relative to the retimer 206. A receiver may record (e.g., determine) the time delay that a signal (e.g., data block or data packet) passing through the receiver may add. This time delay may be in a receiver time domain (e.g., receiver 216 time domain of retimer 206). In one embodiment, to pass the value of this time delay to a different time domain (e.g., to transmitter 222 time domain of retimer 206), the synchronizer may pass the time delay recorded in first domain to a second domain, where the time delay reflects a measurement that had occurred in the first time domain. In one embodiment, a data packet includes a data packet header (e.g., with a timestamp of when it was sent and/or received) and a data packet payload (e.g., the block of data itself). In one embodiment, a data block includes a data block header (e.g., with a timestamp of when it was sent and/or received), a data block payload (e.g., the block of data itself), and/or a block start flag. In one embodiment, a block start flag informs (e.g., a circuit) that a data block is the first data block of a packet.

In one embodiment, the receiver (e.g., receiver of a retimer) runs in a clock domain of (e.g., derived from) the received data, and transmitter (e.g., transmitter and/or controller of a retimer) runs independently off a separate clock domain of (e.g., generated by) the device. Each component (e.g., receiver 216, synchronizer 218, controller 220, and transmitter 222) may introduces delays, e.g., as a data block or data packet is propagated from the receive link to the transmit link.

Certain embodiments of data transmittal circuits (e.g., devices communicating according to USB specifications) may correct a time (e.g., timestamp value) as the time (e.g., timestamp value) propagates through components that are causing a delay. For example, if data (e.g., a data block or data packet) is sent at a time to, (e.g., a timestamp having a value of $t_0$) and traverses a retimer that adds a delay of $\Delta t$, the retimer (e.g., circuit) is to modify the time (e.g., timestamp) such that the retimer outputs a new (corrected) time ($t_{new}$) (e.g., timestamp) that is (e.g., at least) equal to $t_0$ plus $\Delta t$. In certain embodiments, the new time (e.g., timestamp) may further include any delay introduced by link(s) and/or hubs that the data (e.g., a data block or data packet) also passes through. The new time may be a modification of adding a (e.g., tracked by a timer) time delay to time to. In one embodiment, a timer may reset to zero once it is used (e.g., once the subtraction with subtractor (subtractor 434 in FIG. 4 and subtractor 634 in FIG. 6) occurs) to determine the time delay, e.g., in the retimer. Time delay from a component may be tracked (e.g., not estimated) by a timer (e.g., incrementing a clock) in a time domain (e.g., in a receiver time domain). For example, USB Precision Time Management may require each component in the path between a host and a device to track the delay that they introduce as they propagate an Isochronous Timestamp Packet (ITP) downstream, and correct the fields on the ITPs that are forwarded downstream, thus compensating for any delays that they may introduce. Isochronous data may generally refer to a stream of data whose timing is implied by its delivery rate. An isochronous transfer may generally refer to a USB transfer type (e.g., one of four USB transfer types) that are used when working with isochronous data. Isochronous transfers may provide periodic, continuous communication between host and device. Isochronous Timestamp Packet generally refers to a packet of data (e.g., that includes a timestamp) sent periodically by a host to inform devices on the USB of the current bus (e.g., host) time. An example ITP format is depicted below in Table 1.

TABLE 1

Example Isochronous Timestamp Packet (ITP) Format

| Width (bits) | Offset (DW:bit) | Description |
|---|---|---|
| 27 | 0:5 | Isochronous Timestamp (ITS). This isochronous timestamp field is used to identify the current time value from the perspective of the host transmitting the ITP. This timestamp field is split into two sub-fields:<br><br>Bits — Description<br><br>13:0 — Bus interval counter. The current (one Microframe interval) counter, e.g., 125 μs. The count value rolls over to zero when the value reaches a threshold (e.g., 0x3FFF) and continues to increment.<br><br>26:14 — Delta. The time delta from the start of the current ITP packet to the previous bus interval boundary. This value is a number of tIsochTimestampGranularity units. The value used shall specify the delta that comes closest to the previous bus interval boundary without going before the boundary.<br>Note: If a packet starts exactly on a bus interval boundary, the delta time is set to 0. |
| 7 | 1:0 | Bus Interval Adjustment Control. This field specifies the address of the device that controls the bus interval adjustment mechanism. Upon reset, power-up, or if the device is disconnected, the host may set this field to zero. |
| 14 | 1:7 | Correction. This field specifies the negative delay in tIsochTimestampGranularity units that the ITP has accumulated passing through PTM capable hubs. This field shall be set to 0 by the host. |
| 43 | 1:21 | Reserved. |

In one embodiment, a PTM clock is included to serve as a signal source (e.g., with a period of tIsochTimestampGranularity units) to advance various PTM time clocks and time sources.

Figure 4:
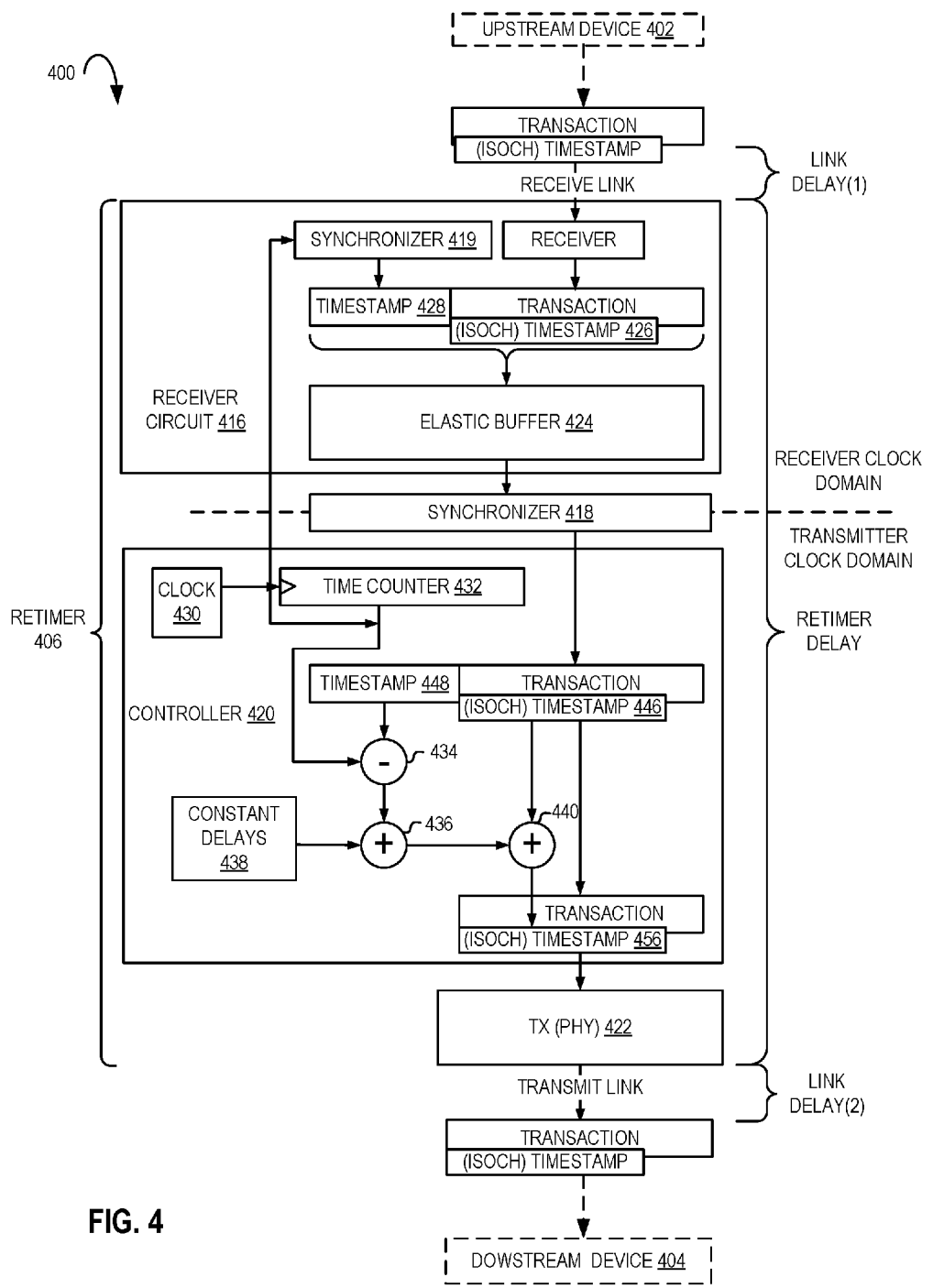
FIG. 4 illustrates a schematic diagram of a circuit including an upstream device coupled to a downstream device through a retimer that utilizes two synchronizers and a time counter according to embodiments of the disclosure.

In certain embodiments herein, a retimer is to update the timestamp (e.g., the Isochronous Timestamp (ITS) in Table 1 above) to reflect (e.g., include) the time delay from components between the downstream facing port of the retimer and the downstream facing port of the upstream device, e.g., this time delay being the link delay (1) and retimer delay in FIG. 4. In one embodiment, the retimer is to update (e.g., modify) the delta field and/or the bus interval counter field of the ITS in Table 1, e.g., according to the disclosure herein. In one embodiment, the retimer is to update (e.g., modify) any field or fields of the ITS in Table 1, e.g., according to the disclosure herein.

In certain embodiments, ITPs are used to deliver timestamps from the host to all active devices. In one embodiment, ITPs carry no addressing or routing information, e.g., and are multicast by hubs to all of their downstream ports with links in the active (e.g., U0) state and/or that have completed Port Configuration. In one embodiment, a device does not respond to an ITP. In one embodiment, an ITP is used to provide host timing information to devices for synchronization. In one embodiment, any device or hub may receive an ITP. In one embodiment, only the host initiates an ITP transmission. In one embodiment, a host is to transmit an ITP in every bus interval within a timestamp window (e.g., from 0 to 0 μs) from a bus interval boundary. An ITP may be transmitted in between data (e.g., payload) packets. If a device receives an ITP with the delayed flag (DL) set in the link control word, the timestamp value may be (e.g., significantly) inaccurate and may be ignored by the device.

In one embodiment, a PTM device does not include a device other than a hub or a link. In certain embodiments, a PTM circuit (e.g., to determine the delay from a link and/or a hub) may be utilized with the embodiments discussed herein, e.g., that determine the delay from a retimer.

Figure 3:
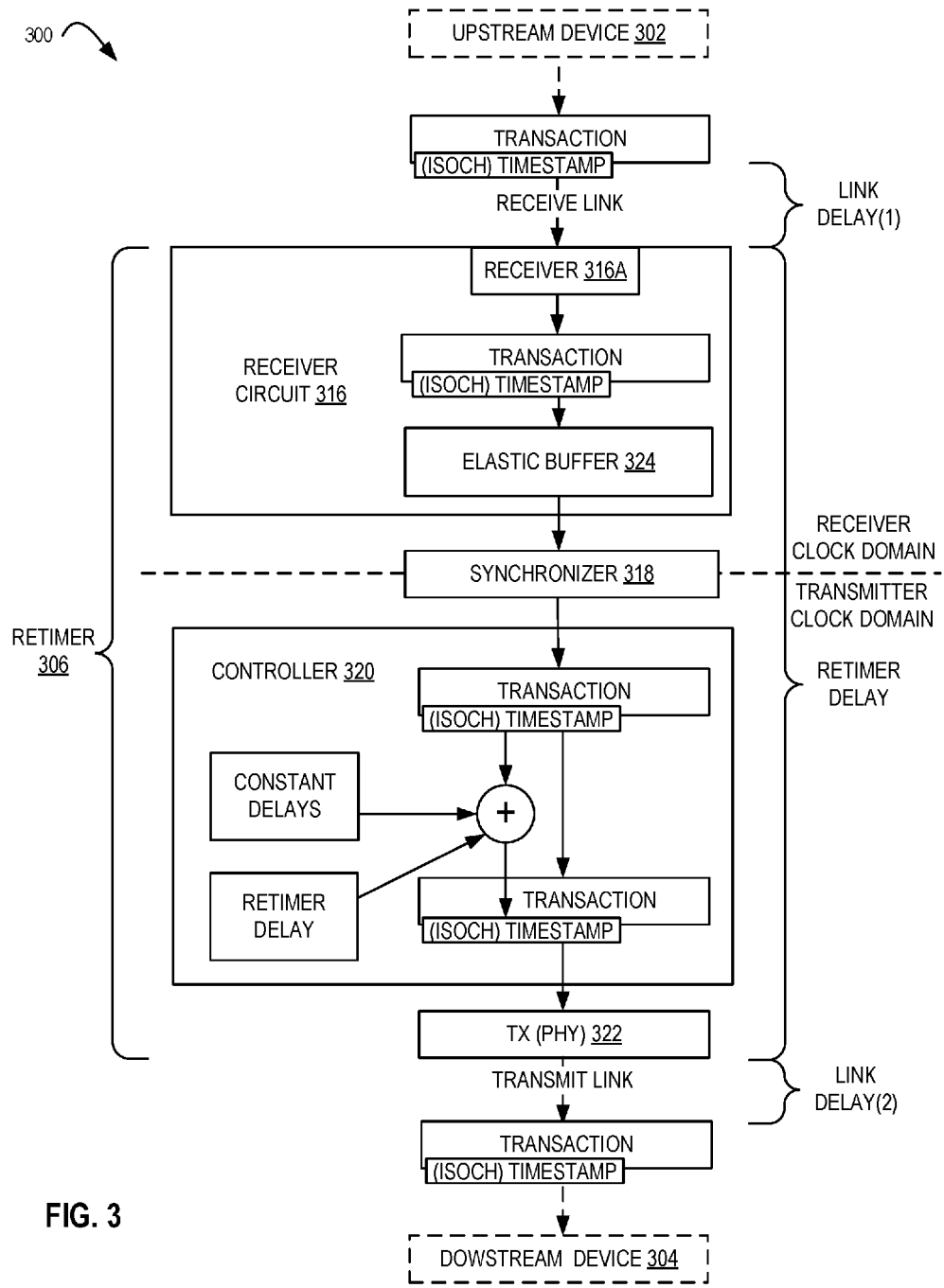
FIG. 3 illustrates a schematic diagram of a circuit including an upstream device coupled to a downstream device through a retimer that passes a timestamp through according to embodiments of the disclosure.

FIG. 3 illustrates a schematic diagram of a circuit 300 including an upstream device 302 coupled to a downstream device 304 through a retimer 306 that passes a timestamp through according to embodiments of the disclosure. Transaction (e.g., transmittal of a data block) is sent, for example, from an upstream device 302. In one embodiment, a transaction may refer to an entire block of data being transmitted, but it may be transmitted in multiple portions (e.g., serially). As discussed above, the (e.g., each) data block may include (e.g., in a field thereof or appended to the data block) a timestamp. In one embodiment, the timestamp is an isochronous timestamp (ITS), e.g., as part of an isochronous timestamp packet (ITP). The data block with its timestamp may be on a path to a downstream device 304. Depicted path includes a retimer 306. For example, receiver circuit 316 (e.g., PHY) may include a receiver 316A (e.g., to receive data) and an (e.g., elastic (elasticity)) buffer 324. In another embodiment, a buffer may be a separate component from a receiver circuit (e.g., PHY). A buffer may be a first in, first out (FIFO) buffer. Elastic buffer may receive portions (e.g., bits or symbols) of a data block (e.g., as multiple transactions) and store them therein, for example, until an entire data block is complete (e.g., ready for transmittal downstream). Timestamp may be added to the transaction (e.g., for a data block) by upstream device 302, for example, at the beginning of the transmittal of the first portion of the data block from the upstream device 302. In one embodiment, the timestamp is originally in the clock domain of the upstream device 302 (e.g., host).

In certain embodiments, the receiver circuit 316 has its own clock domain (e.g., receiver clock domain). A receiver clock domain may be a recovered symbol clock domain. A transmitter clock domain may be a core (e.g., processor core) clock domain In certain embodiments, the controller 320 and/or transmitter 322 have their own, different clock domain (e.g., transmitter clock domain). Synchronizer 318 may pass a data block, for example, a timestamp value, from a first clock domain to a second clock domain. The data block (e.g., at least the first portion of the data block) and its converted timestamp may then be passed to controller 320 (e.g., control circuit). Controller may then modify the (e.g., converted) timestamp to include (e.g., substantially) constant delays (e.g., upstream and/or downstream link delays) and a (e.g., variable) retimer delay (e.g., delays from time spent in the elastic buffer). This modified timestamp and its data block (e.g., at least the first portion of the data block) may begin being transmitted, e.g., by transmitter 322 of retimer 306. Transmitted data block and its modified timestamp may be transmitted to downstream device 304 (e.g., host, hub, or another retimer). Link delays may be determined by a link delay circuit, e.g., as discussed herein. Retimer delay may be determined by tracking (e.g., via controller) the time (e.g., duration) a transaction is delayed in a retimer (e.g., as measured from the same point of ingress and egress from the retimer).

In one embodiment, an elastic buffer has a skip (SKP) added or removed input, e.g., such that the elastic buffer (e.g., or other part of a receiver circuit) may selectively remove these skip signals.

In one embodiment, the components in the receiver clock domain are clocked by a recovered symbol clock, and those components in the transmit clock domain are clocked by a (e.g., different) core clock. For example, bits may be clocked into the elastic buffer (e.g., by the recovered symbol clock) at one frequency and the core clock may retrieve individual byte symbols at a second frequency. In one embodiment, the elastic buffer may hold up to four 1 KB data blocks (e.g., packets), which means that if the elastic buffer is almost full, its output data may be about 17 μs old or if the elastic buffer is empty, then its output data may be just a 10's of ns old. Said another way, an elastic buffer in this embodiment may add between about 0 to 17 μs of delay. In certain embodiments, this range of time (e.g., age) is to be compensated for because it exceeds the target accuracy of PTM (e.g., target accuracy of PTM may be 40 ns).

Certain embodiments of this disclosure measure the actual age of the data. Certain embodiments of this disclosure measure a delay time of the data block in the elastic buffer. In certain embodiments, the clock domains of the Rx and Tx PHYs are running at different rates, so that a time value measured in one domain does not have meaning in the other domain (e.g., when calculating a time differential). In certain embodiments, the receiver (Rx) PHY of a retimer may use its clock to measure this delay and pass that information to the transmitter (Tx) PHY of the retimer, but for this measurement to be meaningful to the Tx PHY, the Tx PHY is to accurately know the difference between its clock and the Rx clock domains (e.g., clock frequencies).

FIG. 4 illustrates a schematic diagram of a circuit 400 including an upstream device 402 coupled to a downstream device 404 through a retimer 406 that utilizes two synchronizers (418, 419) and a time counter 432 according to embodiments of the disclosure. Similar components to those in other Figures may perform similar functions.

Clock 430 (e.g., core clock) in transmitter clock domain may be used to increment a counter 432 (e.g., which may roll back to zero). In one embodiment, a block of data is input into retimer 406 (e.g., schematically illustrated as a transaction). Block of data may include a timestamp (e.g., isochronous timestamp (ITS)). In one embodiment, timestamp 426 may be in the upstream (e.g., host) clock domain or receiver 416 clock domain.

Additional timestamp 428 may be marked with the time representing the receipt of (e.g., the first portion or symbol) of a data block in the transmit clock domain. The additional timestamp 428 may be associated with (e.g., added as a payload to) a data block and its timestamp 426, e.g., by controller 420. However, the transmit time domain timestamp 428 may be converted from the Tx clock domain to the Rx clock domain by an additional synchronizer 419. This data block and its timestamp 426 (for example, isochronous timestamp (ITS), e.g., in the receiver clock domain)) and additional timestamp 428 (e.g., in the receiver clock domain) may then be passed into elastic buffer 424. Elastic buffer 424 may accumulate an entire data block and then start passing the data block to the controller 420 via the synchronizer 418. Synchronizer 418 may pass the data block's timestamp 426 (for example, isochronous timestamp (ITS)) in the receiver clock domain and additional timestamp 428 in the receiver clock domain) unaltered, into the transmitter clock domain as timestamp 446 and additionally timestamp 448, respectively. The controller 420 may then compare (e.g., via the subtractor circuit 434) the additional timestamp 448 (e.g., in the transmitter clock domain) to the current time counter 432 (e.g., in the transmitter clock domain) to determine the amount of delay the data block experienced while in the elastic buffer 424. This delta time output from the subtractor circuit (and optionally with any constant delays 438 associated with the retimer circuit) may be added (e.g., via adder circuit 436) to determine the total delay (e.g., retimer delay and link delay (1)) in the retimer 406. This total delay may then be added (e.g., via adder circuit 440) to the timestamp 446 to produce a timestamp 456 that includes the total delay of propagating through the retimer (and link). Data block and timestamp 456 (e.g., corrected isochronous timestamp (ITS)) may then be passed to a transmitter (e.g., 422) for transmittal, for example, to a downstream device 404. In certain embodiments, the data itself of the data block is not modified during the propagation through the retimer. In one embodiment, the constant delays 438 include only those constant delays upstream from the retimer (e.g., only link delay 1). In one embodiment, the constant delays 438 include those delays (e.g., immediately) upstream from the retimer 406 (e.g., if link delay 1 is known to be constant, e.g. as a fixed length trace on a circuit board).

One embodiment herein allows the receiver to synchronize a timestamp provided by the transmitter of upstream device 402, and associate this timestamp 428 (e.g., time received in transmit domain) with a block of data. The additional timestamp 428 (e.g., added into the data while the data is in the Rx clock domain) may be converted from the Rx clock domain to the Tx clock domain by a (e.g., additional) synchronizer. The additional timestamp may be used to identify the delay of the data through the elastic buffer 424, in transmit domain units.

Although a single retimer is depicted in certain Figures, a plurality of retimers (e.g., in series) may similarly be used (e.g., each retimer according to this disclosure). Although discussed in reference to a retimer, the apparatus, methods, and systems of this disclosure may be utilized with other devices, for example, a device with a buffer that receives a data block with an associated timestamp in a first clock domain and transmits the data block and the corrected timestamp into a second clock domain.

Figure 5:
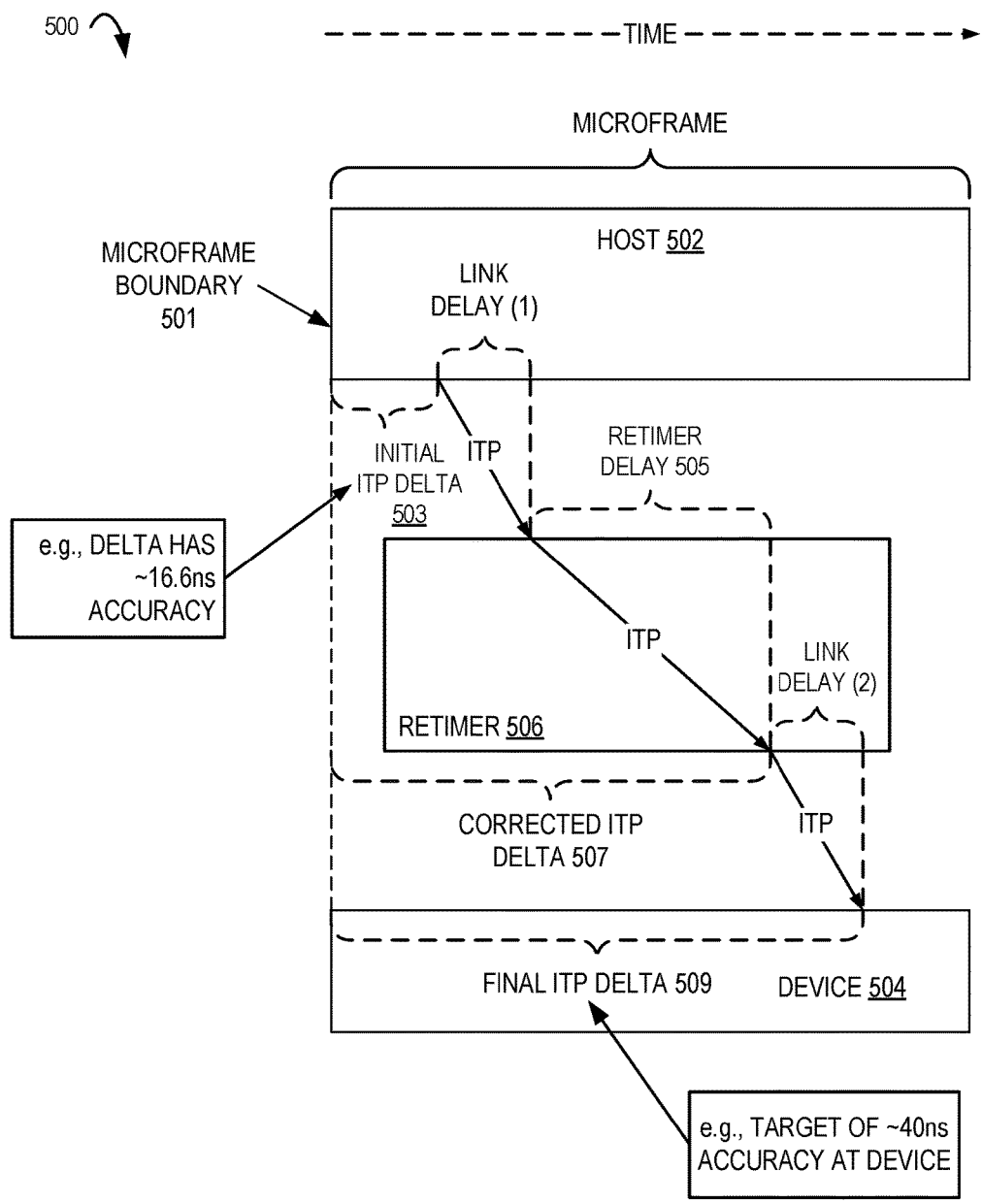
FIG. 5 illustrates a schematic diagram of time delays of a circuit including an upstream device coupled to a downstream device through a retimer according to embodiments of the disclosure.

FIG. 5 illustrates a schematic diagram 500 of time delays of a circuit including an upstream device (e.g., host 502) coupled to a downstream device (e.g., device 504) through a retimer 506 according to embodiments of the disclosure. A microframe (e.g., at regular intervals of bus time) of a transaction may include a boundary 501. A transaction may include (e.g., as part of the Isochronous Timestamp Packet (ITP)) an amount of time from the microframe boundary 501 until a data block begins to transmit, e.g., the initial ITP delta 503. See, e.g., Table 1 above. The depicted data block (and the ITP) is then sent to retimer 506. The link delay (1) caused by the link between the host 502 and retimer 506 may be known, e.g., according to the Link Delay Measurement (LDM) discussed above, or because, due to an implementation, the link delay is constant. The retimer delay 505 may be determined as discussed herein. The retimer delay 505, the link delay (1), and the initial ITP delta 503 may be added together to determine the corrected ITP delta 507, e.g., to obtain the original microframe boundary 501. The link delay (2) caused by the link between the retimer 506 and device 504 may be known to device 504, e.g., according to the Link Delay Measurement (LDM) discussed above, or because the link delay is constant. The corrected ITP generated by the retimer 506 and the link delay (2) may be added together by the device 504 to determine the final ITP delta 509, for example, to obtain the original microframe boundary 501 (e.g., by the device).

Figure 6:
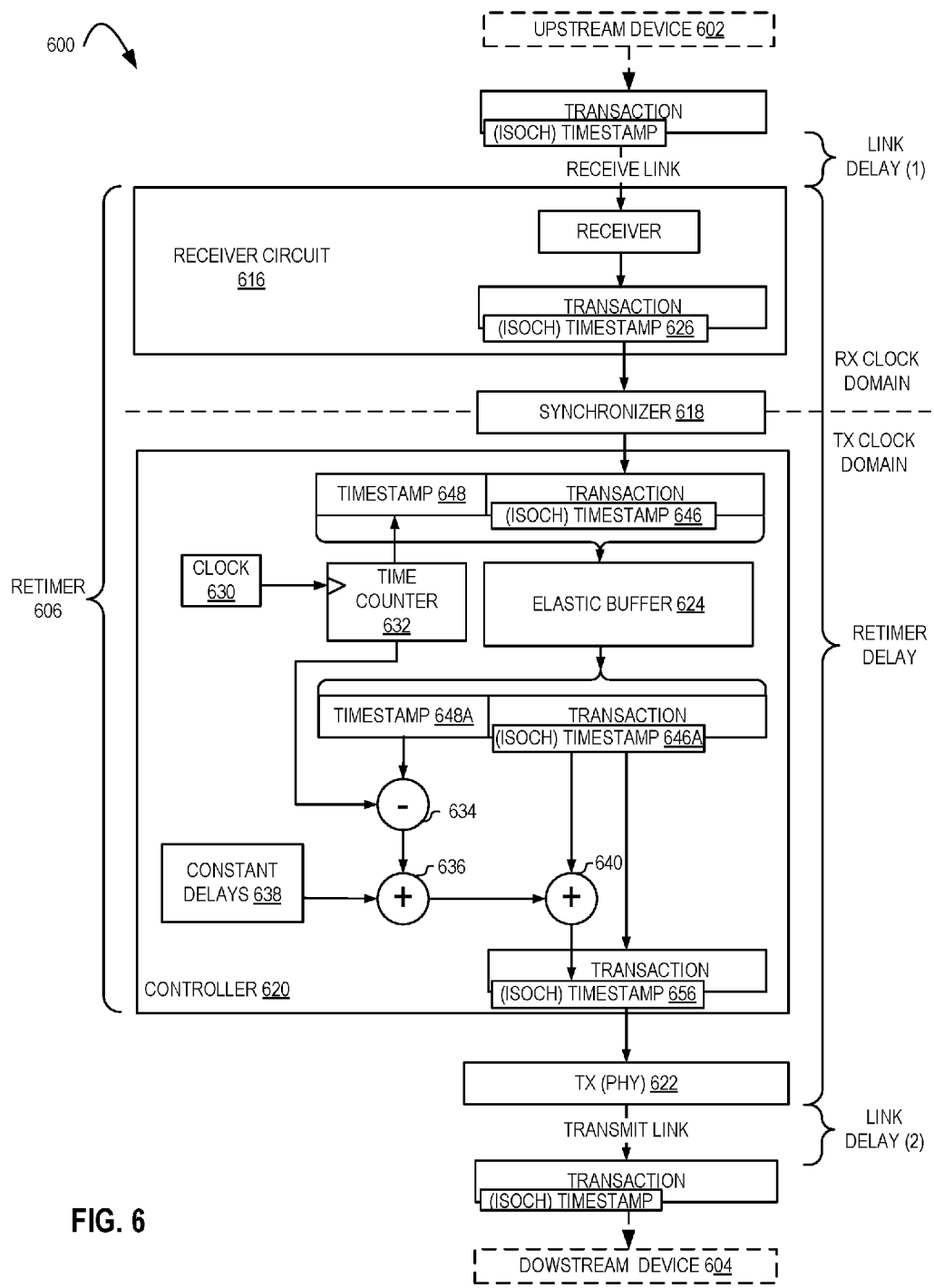
FIG. 6 illustrates a schematic diagram of a circuit including an upstream device coupled to a downstream device through a retimer that utilizes one synchronizer and a time counter according to embodiments of the disclosure.

FIG. 6 illustrates a schematic diagram of a circuit 600 including an upstream device 602 coupled to a downstream device 604 through a retimer 606 that utilizes one synchronizer 618 and a time counter 632 according to embodiments of the disclosure. As depicted in FIG. 6, the elastic buffer 624 is in the controller 620, e.g., in the transmitter clock domain. The timestamp (e.g., ITS) is depicted as passing through the receiver circuit 616 and into synchronizer 618. Synchronizer 618 may pass the data block's timestamp 626 (for example, isochronous timestamp (ITS)) in the receiver clock domain) unaltered into the transmitter clock domain as timestamp 646. Clock 630 (e.g., core clock) in transmitter clock domain may be used to increment a counter 632 (e.g., which may roll back to zero). In one embodiment, a block of data is input into retimer 606 (e.g., schematically illustrated as a transaction). Block of data may include a timestamp (e.g., isochronous timestamp (ITS)). Timestamp 626 may be in the upstream (e.g., host) clock domain or receiver 616 clock domain.

Additional timestamp 648 (e.g., inserted by controller 620) may be marked with the time (e.g., in the transmitter clock domain) representing the receipt of (e.g., the first portion or symbol) a data block. The additional timestamp 648 may be associated with (e.g., added as a payload to) a data block and its timestamp 646, e.g., by controller 620. In one embodiment, the timestamp 626 may be moved from the Rx clock domain to the Tx clock domain by synchronizer 618, e.g., such that a second synchronizer is not utilized. This data block and its timestamp 646 (for example, isochronous timestamp (ITS), e.g., in the transmitter clock domain)) and additional timestamp 648 (e.g., in the transmitter clock domain) may then be passed into elastic buffer 624. Additional timestamp 648A and its associated additional timestamp 646A and data block may have been previously input into elastic buffer 624 and are now being output from the elastic buffer 624. Elastic buffer 624 may accumulate an entire data block and then start passing the data block downstream, e.g., to the subtractor 634 and/or adder 640 of controller 620. Controller 420 may then compare (e.g., via the subtractor circuit 634) the additional timestamp 648A (e.g., in the transmitter clock domain) to the current time counter 632 (e.g., in the transmitter clock domain) to determine the amount of delay the data block experienced through the elastic buffer 624. This delta time output from the subtractor circuit (and optionally with any constant delays 638) may be added (e.g., via adder circuit 636) to determine the total delay in the retimer 606. This total delay may then be added (e.g., via adder circuit 640) to the timestamp 646A to produce a timestamp 656 that includes the total delay of propagating through the retimer (and any link or links). Data block and timestamp 656 (e.g., corrected isochronous timestamp (ITS)) may then be passed to a transmitter (e.g., 622) for transmittal, for example, to a downstream device 604. In certain embodiments, the data block is not modified during the propagation through the retimer. In one embodiment, the constant delays 638 include only those constant delays upstream from the retimer (e.g., only link delay 1). In one embodiment, the constant delays 638 include those constant delays upstream from the retimer (e.g., link delay 1).

Figure 7:
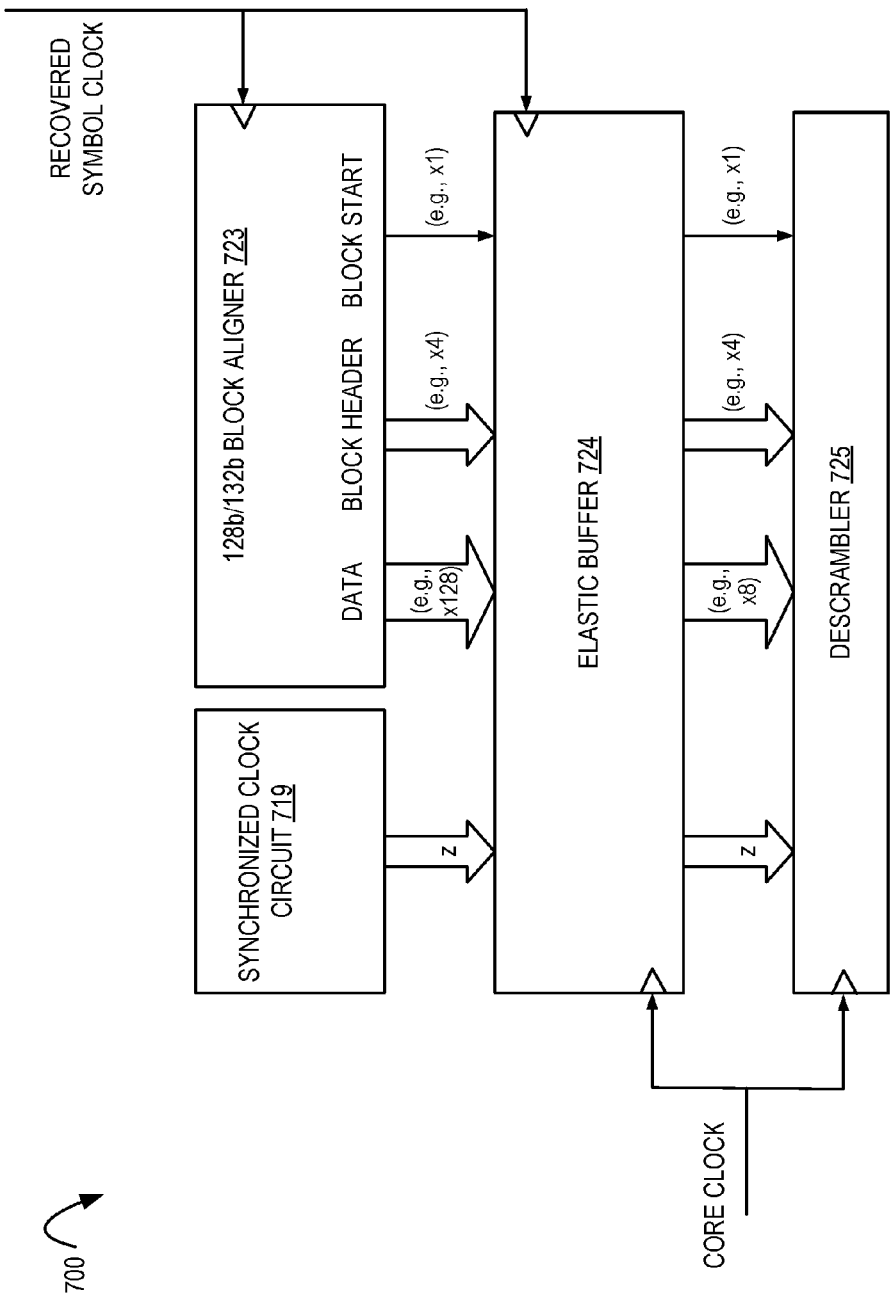
FIG. 7 illustrates a schematic diagram of a receiver according to embodiments of the disclosure.

FIG. 7 illustrates a schematic diagram of a receiver 700 according to embodiments of the disclosure. Receiver 700 includes components for embodiments of this disclosure. Synchronized clock of circuit 719 may be synchronized with the core clock (e.g., in the transmitter clock domain). As the data block (e.g., being aligned by the block aligner 723) may be clocked in by the recovered symbol clock (e.g., in the receiver clock domain), the synchronized clock circuit 719 may insert an additional timestamp (e.g., additional timestamp 428 in FIG. 4) representing the receipt of (e.g., the first portion or symbol) of that data block (and its timestamp, e.g., timestamp 426 in FIG. 4). In another embodiment, synchronized clock circuit 719 may be replaced with a time counter circuit, e.g., time counter 632 in the embodiment in FIG. 6.

For example, on the input of the elastic buffer 724, one (4-bit) block header may be received for every 128 symbol bits. On the output of the elastic buffer 724, the block header may be available for each (e.g., 8-bit) symbol of the block, and the block start flag may indicate which data block is the first symbol of a packet. In one embodiment, a pre-synchronized additional timestamp from the synchronized clock circuit 719 is written into the elastic buffer with its associated data, block header, and block start flag. In one embodiment, the (e.g., additional) timestamp is available on the output of the elastic buffer 724 (and descrambler 725), e.g., where the block start flag is to identify the first data block of the packet that the timestamp references. In one embodiment, because the timestamp is recorded by the recovered symbol clock (e.g., Rx clock domain) at 75 MHz, it has a 13.2 ns accuracy. The size of the (e.g., additional) timestamp (e.g., "Z") may be any value, for example, multiple bits or bytes.

Figure 8:
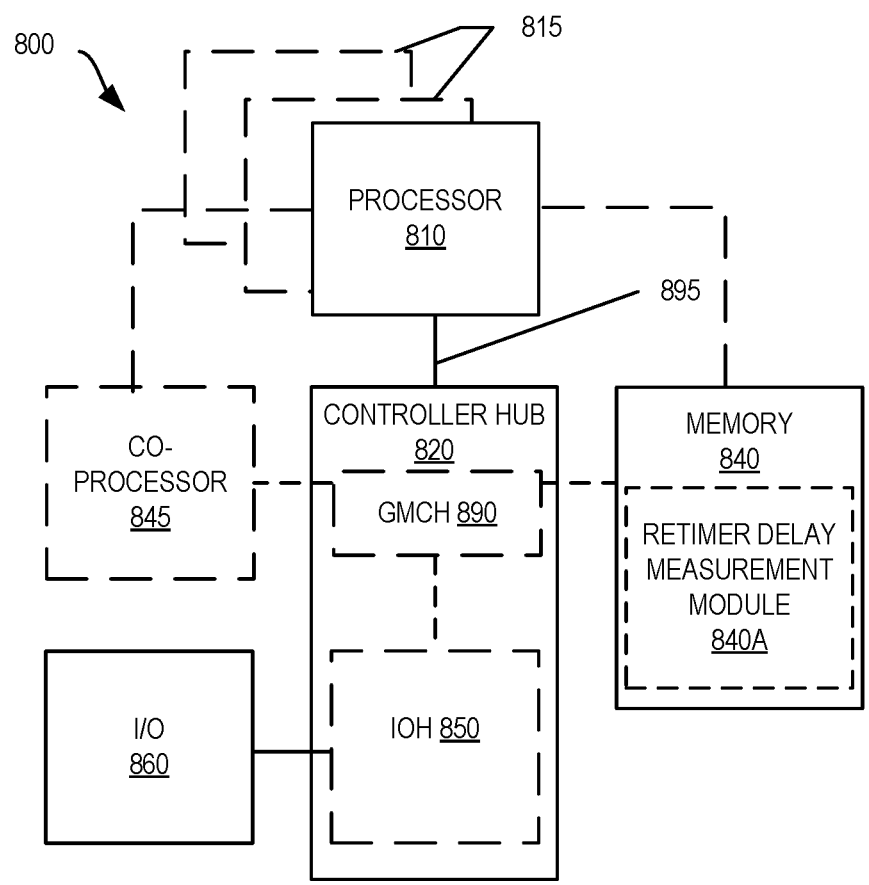
FIG. 8 illustrates a block diagram of a computing system according to embodiments of the disclosure.

FIG. 8 illustrates a block diagram of a computing system 800 according to embodiments of the disclosure. FIG. 8 is a block diagram of an exemplary computer architecture. Other system designs and configurations known in the arts for laptops, tablets, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

The computing system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips), e.g., a USB port to connect to a peripheral or device; the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850. Memory 840 may include a retimer delay measurement module 840A, for example, to store code that when executed causes a processor to perform any method of this disclosure. Retimer delay measurement may be implemented with a hardware state machine.

The optional nature of additional processors 815 is denoted in FIG. 8 with broken lines. Each processor 810, 815 may include one or more of the processing cores described herein and may be some version of the processor QAG00.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9A:
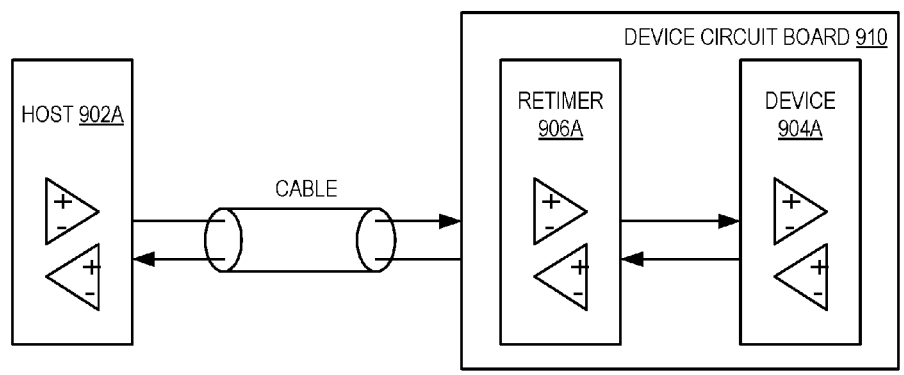
FIGS. 9A-9D illustrate schematic diagrams of circuits including a host coupled to a device through one or more retimers according to embodiments of the disclosure.
Figure 9B:
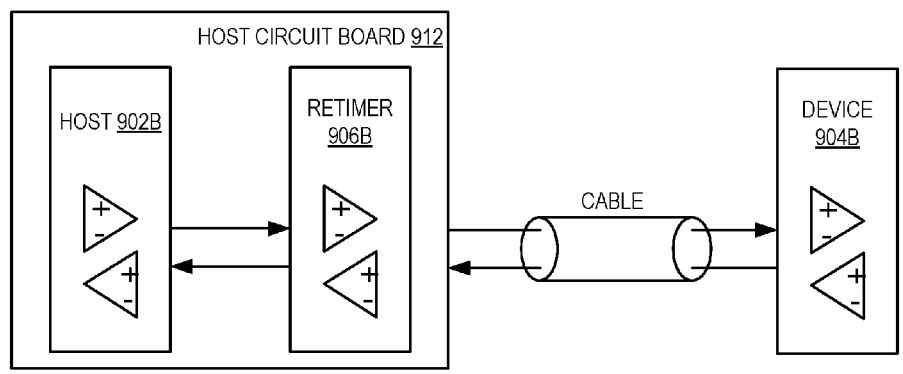
Figure 9C:
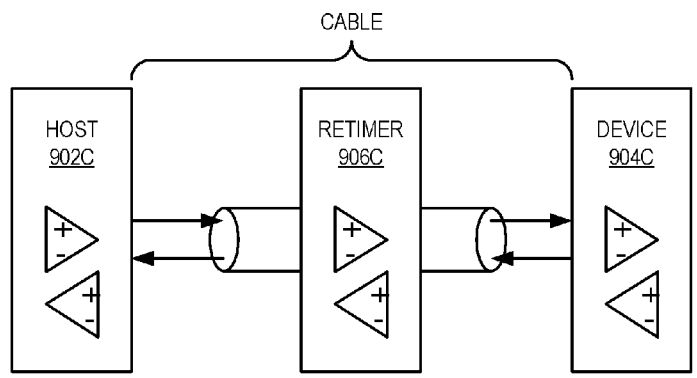
Figure 9D:
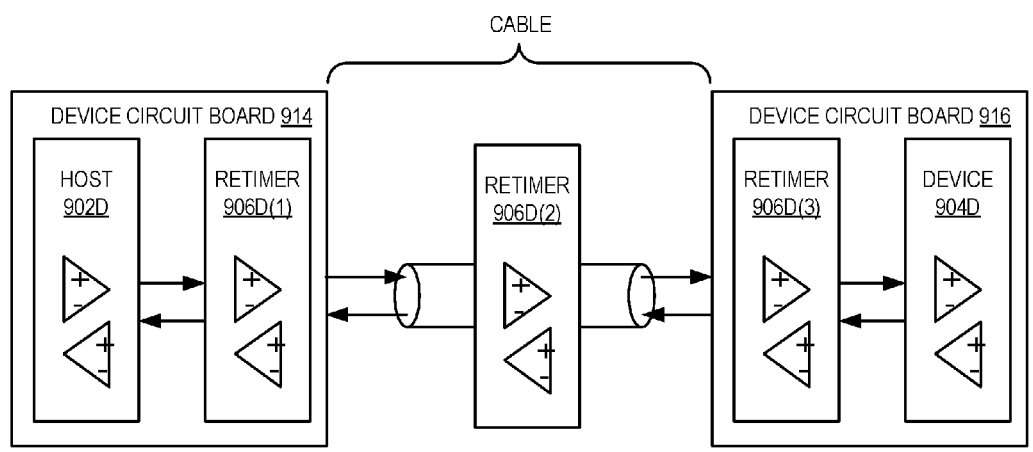

FIGS. 9A-9D illustrate schematic diagrams of circuits including a host coupled to a device through one or more retimers according to embodiments of the disclosure. FIG. 9A illustrates a host 902A connected (e.g., via a cable) to a device circuit board 910 that includes a retimer 906A connected to a device 904A. FIG. 9B illustrates a device 904B connected to a host circuit board 912 that includes a retimer 906B connected to a host 902B. FIG. 9C illustrates a host 902C connected to a retimer 906C connected to a device 904C. FIG. 9D illustrates a host circuit board 914 that includes a retimer 906D(1) connected to a host 902D, and the retimer 906D(1) is connected to retimer 906D(2), which is connected to a device circuit board 916 that includes a retimer 906D(3) connected to a device 904D.

Figure 10:
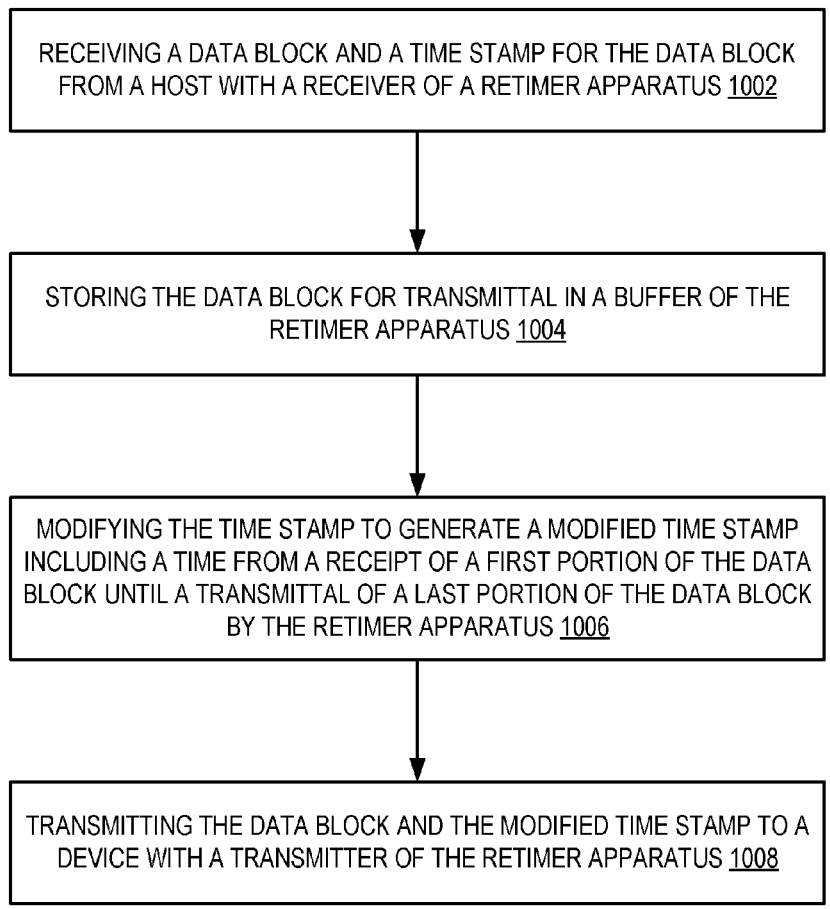
FIG. 10 illustrates a flow diagram according to embodiments of the disclosure.

FIG. 10 illustrates a flow diagram 1000 according to embodiments of the disclosure. Depicted flow 1000 includes receiving a data block and a timestamp for the data block from a host with a receiver of a retimer apparatus 1002, storing the data block for transmittal in a buffer of the retimer apparatus 1004, modifying the timestamp to generate a modified timestamp including a time from a receipt of a first portion of the data block until a transmittal of a last portion of the data block by the retimer apparatus 1006, and transmitting the data block and the modified timestamp to a device with a transmitter of the retimer apparatus 1008.

In certain embodiments herein, an isochronous timestamp is modified (e.g., incremented) internally in a retimer, e.g., by a controller (e.g., a controller circuit). Certain embodiments herein provide for a second synchronizer that an Rx PHY uses to synchronize a time value from the Tx PHY's clock domain, e.g., which may then be used to tag a data block (e.g., packet) that it receives (as it is received off the wire) with a timestamp that has meaning in the Tx PHY's clock domain when they are transmitted.

In certain embodiments, apparatuses, systems, and methods accurately measure a data block's (e.g., packet) propagation delays through retimers (e.g., USB retimer, PCIe retimer, or any retimer that supports PTM), for example, retimers which use independent clock domains therein for receiving and transmitting data. Certain embodiments herein are used for a USB retimers to support Precision Time Management (PTM), e.g., retimers with PTM support. In one embodiment, PTM allows the devices attached to a USB controller to maintain a (e.g., master) clock that is within 40 ns of the (e.g., master) clock maintained by other devices attached to the controller. In certain embodiments, this precision allows support of applications that utilize time critical synchronization between devices, e.g. for coordinating the traces generated by multiple independent USB analog to digital converters (A/Ds), to coordinate audio capture and generation across multiple USB devices, etc. In certain embodiments, this precision is to be maintained as multiple components (e.g. retimers) are added (e.g., in series) to the path between a USB host (e.g., host controller) and a device. In certain embodiments, PTM is used to synchronize data across bus technologies, (e.g., USB and PCIe), Ethernet, Wi-Fi, etc.

In certain embodiments, (e.g., to extend the length of USB cables and traces) a retimer (e.g., for USB SuperSpeed (SS) and SuperSpeedPlus (SSP) links) is as a transparent component that is to be inserted in the path between a USB host and device. In certain embodiments, accurately calculating the ITP delay by a downstream device may be problematic if standard retimer architectures are applied to the problem, e.g., where the Rx and TX PHYs of a retimer use separate clock domains such that time measured in one clock domain does not have meaning to time measured in another clock domain. Certain uses of USB devices may rely on a retimer accurately measuring time delays spanning both domains.

In certain embodiments, a retimer controller (e.g., which resides in the Tx clock domain) maintains a time counter that is used to generate a timestamp (e.g., value). The output of the time counter may be passed to the Rx PHY, e.g., which synchronizes the timestamp value generated in the Tx clock domain to its own Rx clock domain. When a block of data (e.g., packet) is received by the retimer, it may be assigned an Rx clock domain synchronized timestamp immediately, e.g., before it is placed in the elastic buffer. In one embodiment, the (e.g., synchronized time) timestamped packet propagates through the elastic buffer and the synchronizer (e.g., from Rx clock domain to Tx clock domain), and is presented to the controller. In one embodiment, when the data block (e.g., packet) is prepared for transmission, the additional timestamp (e.g., in the Tx clock domain) associated with a data block (e.g., packet) is subtracted from the current value of the time counter (e.g., in the Tx clock domain), for example, and any constant delays within the retimer are added, e.g., where the constant delays include the delay through the Rx and Tx PHYs, controller, etc. (e.g., anything except the elastic buffer). The result may thus represent the total delay (e.g., in time units of the Tx clock domain) for that data block (e.g., packet) through the retimer. The result in certain embodiments is a highly accurate measurement of the end to end delay through the retimer. In one embodiment, the total delay is added to the Isochronous Timestamp value, so that the transmitted ITP accurately represents the time it was (re-) transmitted by the retimer. Note that these approaches may also compensate for delays introduced by spread spectrum clocking techniques. Certain embodiments herein do not utilize an (e.g., constant) average elastic buffer delay when correcting the Isochronous Timestamp value, for example, as such an approach may make the ITP virtually useless, e.g., where the Isochronous Timestamp of an ITP represents the precise time relative to that packet being transmitted, not an average value. Certain embodiments herein allow a transmitted ITP value to include the upstream link delay for it to accurately represent the time that it was retransmitted, e.g., all the downstream device knows is the ITP value and its upstream link delay (i.e., to the retimer) so it uses retimer and the retimers upstream link delay info (embedded in the ITP) to correctly calculate the microframe boundary.

Certain embodiments herein allow a Tx PHY to apply an accurate correction for the delay that it introduces to the ITPs that it transmits downstream, e.g., compensating for elastic buffer and spread spectrum clocking variations. In one embodiment, within an ITP there is an Isochronous Timestamp which identifies the absolute time that the data block (e.g., packet) was transmitted. The receiver of an ITP can add the upstream link delay (e.g., calculated using a Link Delay Measurement (LDM) circuit) to the Isochronous Timestamp to determine the true absolute time at its receipt. In certain embodiments, when an ITP is propagated through a retimer, the retimer is expected to adjust the Isochronous Timestamp that it transmits downstream to compensate for that upstream link delay and any internal delays that it introduced, therefore for this retimer: Transmitted Isochronous Timestamp=Received Isochronous Timestamp+Upstream Link delay+Internal Delay. The internal delay may be the time from when the ITP was received by a retimer to when it is transmitted, e.g., and be accurate to within 40 ns. In one embodiment, multiple components contribute to the internal delay, e.g., certain of which are constant, however in certain embodiments, a critical variable delay is the time through the elastic buffer. This delay may depend on many variables, e.g., clock jitter, clock drift, spread spectrum clocking modulation, received packet sizes, inter-packet delays, etc., and may vary from 0 to 17 µs. Certain embodiments herein allow for the accurate measurement of the delays introduced by elastic buffers and/or spread spectrum clocking. Certain retimers may include a Rx PHY that is an independent component within a retimer and an elastic buffer that is an integrated component of the Rx PHY block and avoid any timestamping which would take place after a data block (e.g., packet) was pulled from the elastic buffer and synchronized, e.g., too late to provide the accuracy required by PTM.

In one embodiment, a retimer apparatus (e.g., retimer circuit) includes a receiver to receive a data block and a timestamp for the data block from an upstream device, a buffer to store the data block and the timestamp (e.g., and an additional timestamp) for transmittal, a controller to modify the timestamp (e.g. received ITS) to generate a modified timestamp (e.g. transmit ITS) that includes a time from a receipt of a (e.g., first or last) portion of the data block in the buffer until a transmittal of the (e.g., first or last) portion of the data block from the buffer, and a transmitter to transmit the data block and the modified timestamp (e.g. ITS) to a downstream device. The time from receipt of the first portion of the data block until the transmittal of the first portion of the data block may be tracked in a single clock domain. The modified timestamp may be a modified Isochronous Timestamp Packet. The controller may further modify the timestamp to generate the modified timestamp (e.g. ITS) that includes a Link Delay Measurement for a first link between the upstream device and the retimer apparatus. The controller may associate a second timestamp with the timestamp from the upstream device. The second (e.g. additional) timestamp may be in a clock domain of the transmitter. The second timestamp may pass through the buffer with the data block and the timestamp for the data block. The retimer apparatus may further include a counter to track the time from receipt of the first portion of the data block until the transmittal of the first portion of the data block.

In another embodiment, a method includes receiving a data block and a timestamp (e.g., and an additional timestamp) for the data block from an upstream device with a receiver of a retimer apparatus, storing the data block and the timestamp for transmittal in a buffer of the retimer apparatus, modifying the timestamp (e.g. ITS) to generate a modified timestamp (e.g. ITS) including a time from a receipt of a first portion of the data block in the buffer until a transmittal of the first portion of the data block from the buffer, and transmitting the data block and the modified timestamp (e.g. ITS) to a downstream device with a transmitter of the retimer apparatus. The time from receipt of the first portion of the data block until the transmittal of the first portion of the data block is tracked in a single clock domain. The modified timestamp may be a modified Isochronous Timestamp Packet. The method may include further modifying the timestamp to generate the modified timestamp including a Link Delay Measurement for the link between the upstream device and the retimer apparatus. The method may include associating a second (additional) timestamp with the timestamp from the upstream device (e.g. ITS). The second timestamp may be in a clock domain of the transmitter. The method may include passing the second timestamp through the buffer with the data block and the timestamp for the data block. The method may include tracking the time from receipt of the first portion of the data block until the transmittal of the first portion of the data block with a counter.

In yet another embodiment, an apparatus includes a hardware processor, a host, and a retimer apparatus including a receiver to receive a data block and a timestamp for the data block from the host, a buffer to store the data block and the timestamp for transmittal, a controller to modify the timestamp (e.g. ITS) to generate a modified timestamp (e.g. ITS) that includes a time from a receipt of a first portion of the data block in the buffer until a transmittal of the first portion of the data block from the buffer, and a transmitter to transmit the data block and the modified timestamp to a downstream device. The time from receipt of the first portion of the data block until the transmittal of the first portion of the data block may be tracked in a single clock domain. The modified timestamp (e.g. ITS) may be a modified Isochronous Timestamp Packet. The controller may further modify the timestamp (e.g. ITS) to generate the modified timestamp (e.g. ITS) that includes a Link Delay Measurement for the link between the host and the retimer apparatus. The controller may associate a second (additional) timestamp with the timestamp from the host. The second timestamp may be in a clock domain of the transmitter. The second timestamp may pass through the buffer with the data block and the timestamp for the data block. The apparatus may further include a counter to track the time from receipt of the first portion of the data block until the transmittal of the first portion of the data block.

In another embodiment, an apparatus (e.g., retimer circuit) includes means to receive a data block and a timestamp (e.g. ITS) for the data block from an upstream device, means to store the data block (e.g., and timestamp) for transmittal, means to modify the timestamp to generate a modified timestamp that includes a time from a receipt of a first (e.g., or last) portion of the data block until a transmittal of the first (e.g., or last) portion of the data block, and means to transmit the data block and the modified timestamp to a downstream device. In one embodiment, a data block includes one or a plurality of skip symbols.

In yet another embodiment, an apparatus comprises a data storage device that stores code that when executed by a hardware processor causes the hardware processor to perform any method disclosed herein. An apparatus may be as described in the detailed description. A method may be as described in the detailed description.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 11:
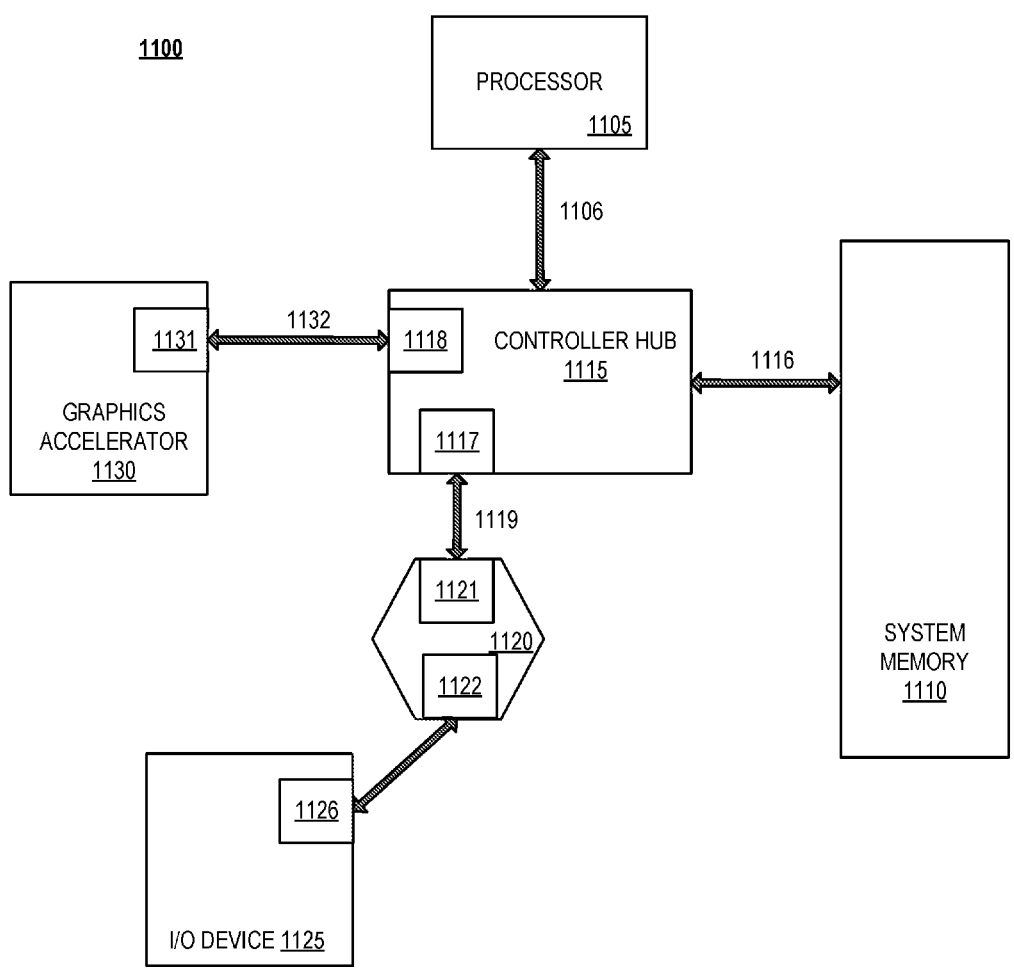
FIG. 11 illustrates a computing system including a peripheral component interconnect express (PCIe) compliant architecture according to embodiments of the disclosure.

Referring to FIG. 11, an embodiment of a fabric composed of point-to-point Links that interconnect a set of components is illustrated. System 1100 includes processor 1105 and system memory 1110 coupled to controller hub 1115. Processor 1105 includes any processing element, such as a microprocessor, a host processor, an embedded processor, a coprocessor, or other processor. Processor 1105 is coupled to controller hub 1115 through front-side bus (FSB) 1106. In one embodiment, FSB 1106 is a serial point-to-point interconnect as described below. In another embodiment, link 1106 includes a serial, differential interconnect architecture that is compliant with different interconnect standard.

System memory 1110 includes any memory device, such as random access memory (RAM), non-volatile (NV) memory, or other memory accessible by devices in system 1100. System memory 1110 is coupled to controller hub 1115 through memory interface 1116. Examples of a memory interface include a double-data rate (DDR) memory interface, a dual-channel DDR memory interface, and a dynamic RAM (DRAM) memory interface.

In one embodiment, controller hub 1115 is a root hub, root complex, or root controller in a Peripheral Component Interconnect Express (PCIe or PCIE) interconnection hierarchy. Examples of controller hub 1115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 1105, while controller 1115 is to communicate with I/O devices, in a similar manner as described below. In some embodiments, peer-to-peer routing is optionally supported through root complex 1115.

Here, controller hub 1115 is coupled to switch/bridge 1120 through serial link 1119. Input/output modules 1117 and 1121, which may also be referred to as interfaces/ports 1117 and 1121, include/implement a layered protocol stack to provide communication between controller hub 1115 and switch 1120. In one embodiment, multiple devices are capable of being coupled to switch 1120.

Switch/bridge 1120 routes packets/messages from device 1125 upstream, i.e. up a hierarchy towards a root complex, to controller hub 1115 and downstream, i.e. down a hierarchy away from a root controller, from processor 1105 or system memory 1110 to device 1125. Switch 1120, in one embodiment, is referred to as a logical assembly of multiple virtual PCI-to-PCI bridge devices. Device 1125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1125 may include a PCIe to PCI/PCI-X bridge to support legacy or other version PCI devices. Endpoint devices in PCIe are often classified as legacy, PCIe, or root complex integrated endpoints.

Graphics accelerator 1130 is also coupled to controller hub 1115 through serial link 1132. In one embodiment, graphics accelerator 1130 is coupled to an MCH, which is coupled to an ICH. Switch 1120, and accordingly I/O device 1125, is then coupled to the ICH. I/O modules 1131 and 1118 are also to implement a layered protocol stack to communicate between graphics accelerator 1130 and controller hub 1115. Similar to the MCH discussion above, a graphics controller or the graphics accelerator 1130 itself may be integrated in processor 1105.

Figure 12:
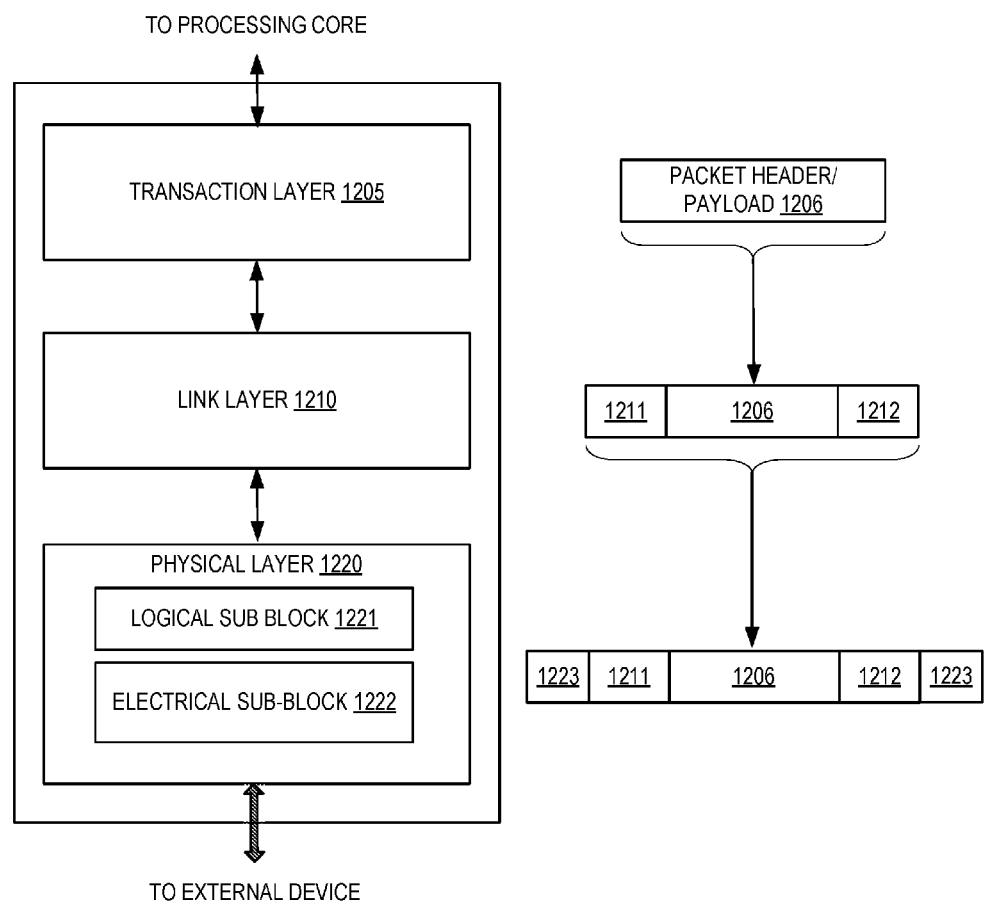
FIG. 12 illustrates a PCIe compliant interconnect architecture including a layered stack according to embodiments of the disclosure.

Turning to FIG. 12 an embodiment of a layered protocol stack is illustrated. Layered protocol stack 1200 includes any form of a layered communication stack, such as a Quick Path Interconnect (QPI) stack, a PCIe stack, a next generation high performance computing interconnect stack, or other layered stack. Although the discussion immediately below in reference to FIGS. 11-14 are in relation to a PCIe stack, the same concepts may be applied to other interconnect stacks. In one embodiment, protocol stack 1200 is a PCIe protocol stack including transaction layer 1205, link layer 1210, and physical layer 1220. An interface, such as interfaces 1117, 1118, 1121, 1122, 1126, and 1131 in FIG. 1, may be represented as communication protocol stack 1200. Representation as a communication protocol stack may also be referred to as a module or interface implementing/including a protocol stack.

PCI Express uses packets to communicate information between components. Packets are formed in the Transaction Layer 1205 and Data Link Layer 1210 to carry the information from the transmitting component to the receiving component. As the transmitted packets flow through the other layers, they are extended with additional information necessary to handle packets at those layers. At the receiving side the reverse process occurs and packets get transformed from their Physical Layer 1220 representation to the Data Link Layer 1210 representation and finally (for Transaction Layer Packets) to the form that can be processed by the Transaction Layer 1205 of the receiving device.

Transaction Layer

In one embodiment, transaction layer 1205 is to provide an interface between a device's processing core and the interconnect architecture, such as data link layer 1210 and physical layer 1220. In this regard, a primary responsibility of the transaction layer 1205 is the assembly and disassembly of packets (i.e., transaction layer packets, or TLPs). The translation layer 1205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1205 assembles packet header/payload 1206. Format for current packet headers/payloads may be found in the PCIe specification at the PCIe specification website.

Figure 13:
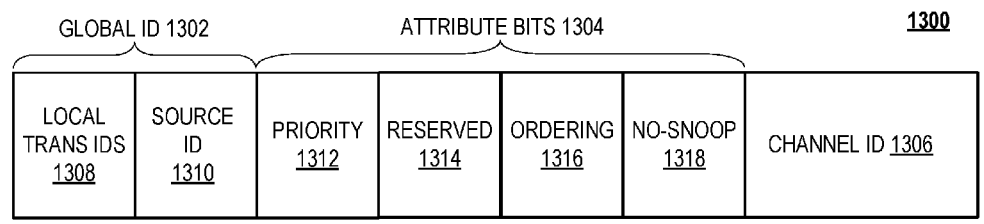
FIG. 13 illustrates a PCIe compliant request or packet to be generated or received within an interconnect architecture according to embodiments of the disclosure.

Referring to FIG. 13, an embodiment of a PCIe transaction descriptor is illustrated. In one embodiment, transaction descriptor 1300 is a mechanism for carrying transaction information. In this regard, transaction descriptor 1300 supports identification of transactions in a system. Other potential uses include tracking modifications of default transaction ordering and association of transaction with channels.

Transaction descriptor 1300 includes global identifier field 1302, attributes field 1304 and channel identifier field 1306. In the illustrated example, global identifier field 1302 is depicted comprising local transaction identifier field 1308 and source identifier field 1310. In one embodiment, global transaction identifier 1302 is unique for all outstanding requests.

According to one implementation, local transaction identifier field 1308 is a field generated by a requesting agent, and it is unique for all outstanding requests that require a completion for that requesting agent. Furthermore, in this example, source identifier 1310 uniquely identifies the requestor agent within a PCIe hierarchy. Accordingly, together with source ID 1310, local transaction identifier 1308 field provides global identification of a transaction within a hierarchy domain.

Attributes field 1304 specifies characteristics and relationships of the transaction. In this regard, attributes field 1304 is potentially used to provide additional information that allows modification of the default handling of transactions. In one embodiment, attributes field 1304 includes priority field 1312, reserved field 1314, ordering field 1316, and no-snoop field 1318. Here, priority sub-field 1312 may be modified by an initiator to assign a priority to the transaction. Reserved attribute field 1314 is left reserved for future, or vendor-defined usage. Possible usage models using priority or security attributes may be implemented using the reserved attribute field.

In this example, ordering attribute field 1316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1318 is utilized to determine if transactions are snooped. As shown, channel ID Field 1306 identifies a channel that a transaction is associated with.

Link Layer

Link layer 1210, also referred to as data link layer 1210, acts as an intermediate stage between transaction layer 1205 and the physical layer 1220. In one embodiment, a responsibility of the data link layer 1210 is providing a reliable mechanism for exchanging Transaction Layer Packets (TLPs) between two components a link. One side of the Data Link Layer 1210 accepts TLPs assembled by the Transaction Layer 1205, applies packet sequence identifier 1211, i.e. an identification number or packet number, calculates and applies an error detection code, i.e. CRC 1212, and submits the modified TLPs to the Physical Layer 1220 for transmission across a physical to an external device.

Physical Layer

In one embodiment, physical layer 1220 includes logical sub block 1221 and electrical sub-block 1222 to physically transmit a packet to an external device. Here, logical sub-block 1221 is responsible for the "digital" functions of Physical Layer 1221. In this regard, the logical sub-block includes a transmit section to prepare outgoing information for transmission by physical sub-block 1222, and a receiver section to identify and prepare received information before passing it to the Link Layer 1210.

Physical block 1222 includes a transmitter and a receiver. The transmitter is supplied by logical sub-block 1221 with symbols, which the transmitter serializes and transmits onto to an external device. The receiver is supplied with serialized symbols from an external device and transforms the received signals into a bit-stream. The bit-stream is de-serialized and supplied to logical sub-block 1221. In one embodiment, an 8b/10b transmission code is employed, where ten-bit symbols are transmitted/received. Here, special symbols are used to frame a packet with frames 1223. In addition, in one example, the receiver also provides a symbol clock recovered from the incoming serial stream.

As stated above, although transaction layer 1205, link layer 1210, and physical layer 1220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 14:
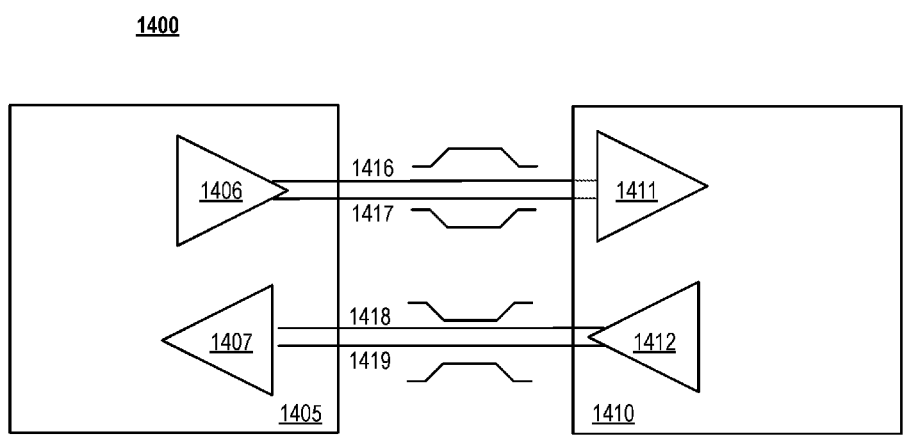
FIG. 14 illustrates a transmitter and receiver pair for a PCIe compliant interconnect architecture according to embodiments of the disclosure.

Referring next to FIG. 14, an embodiment of a PCIe serial point to point fabric 1400 is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1406/1411 and a receive pair 1412/1407. Accordingly, device 1405 includes transmission logic 1406 to transmit data to device 1410 and receiving logic 1407 to receive data from device 1410. In other words, two transmitting paths, i.e. paths 1416 and 1417, and two receiving paths, i.e. paths 1418 and 1419, are included in a PCIe link.

A transmission path refers to any path for transmitting data, such as a transmission line, a copper line, an optical line, a wireless communication channel, an infrared communication link, or other communication path. A connection between two devices, such as device 1405 and device 1410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 15:
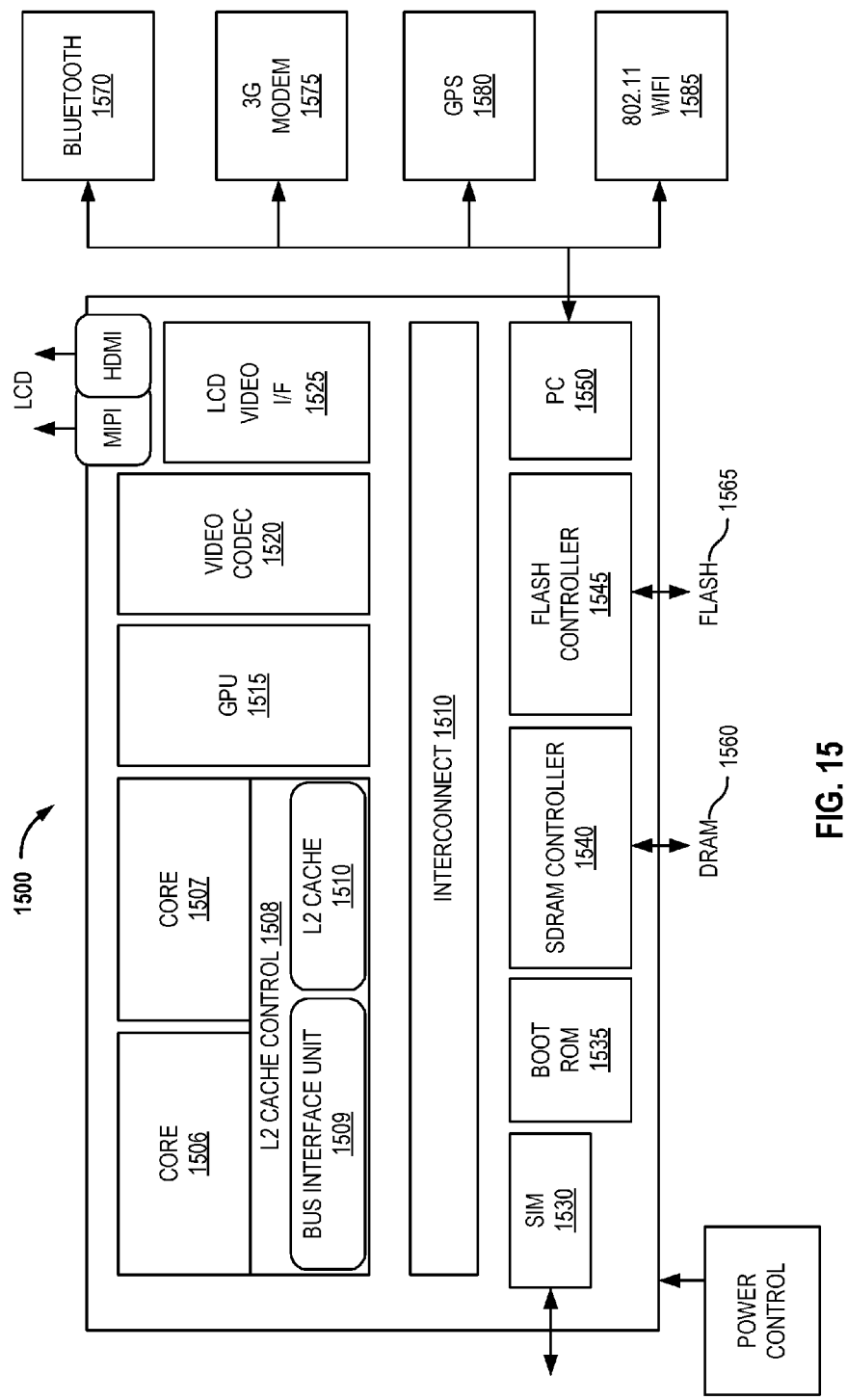
FIG. 15 illustrates a computing system on a chip according to embodiments of the disclosure.

Turning next to FIG. 15, an embodiment of a system on-chip (SOC) design in accordance with the embodiments is depicted. As a specific illustrative example, SOC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1500 includes 2 cores—1506 and 1507. Similar to the discussion above, cores 1506 and 1507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of system 1500. Interconnect 1510 includes an on-chip interconnect, such as an IOSF, AMBA, or other interconnect discussed above, which potentially implements one or more aspects of the described embodiments.

Interface 1510 provides communication channels to the other components, such as a Subscriber Identity Module (SIM) 1530 to interface with a SIM card, a boot ROM 1535 to hold boot code for execution by cores 1506 and 1507 to initialize and boot SOC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces may incorporate aspects of the embodiments described herein.

In addition, the system illustrates peripherals for communication, such as a Bluetooth module 1570, 3G modem 1575, GPS 1580, and WiFi 1585. Note as stated above, a UE includes a radio for communication. As a result, these peripheral communication modules are not all required. However, in a UE some form a radio for external communication is to be included.

Note that the apparatus, methods, and systems described above may be implemented in any electronic device or system as aforementioned. As specific illustrations, the figures below provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 16:
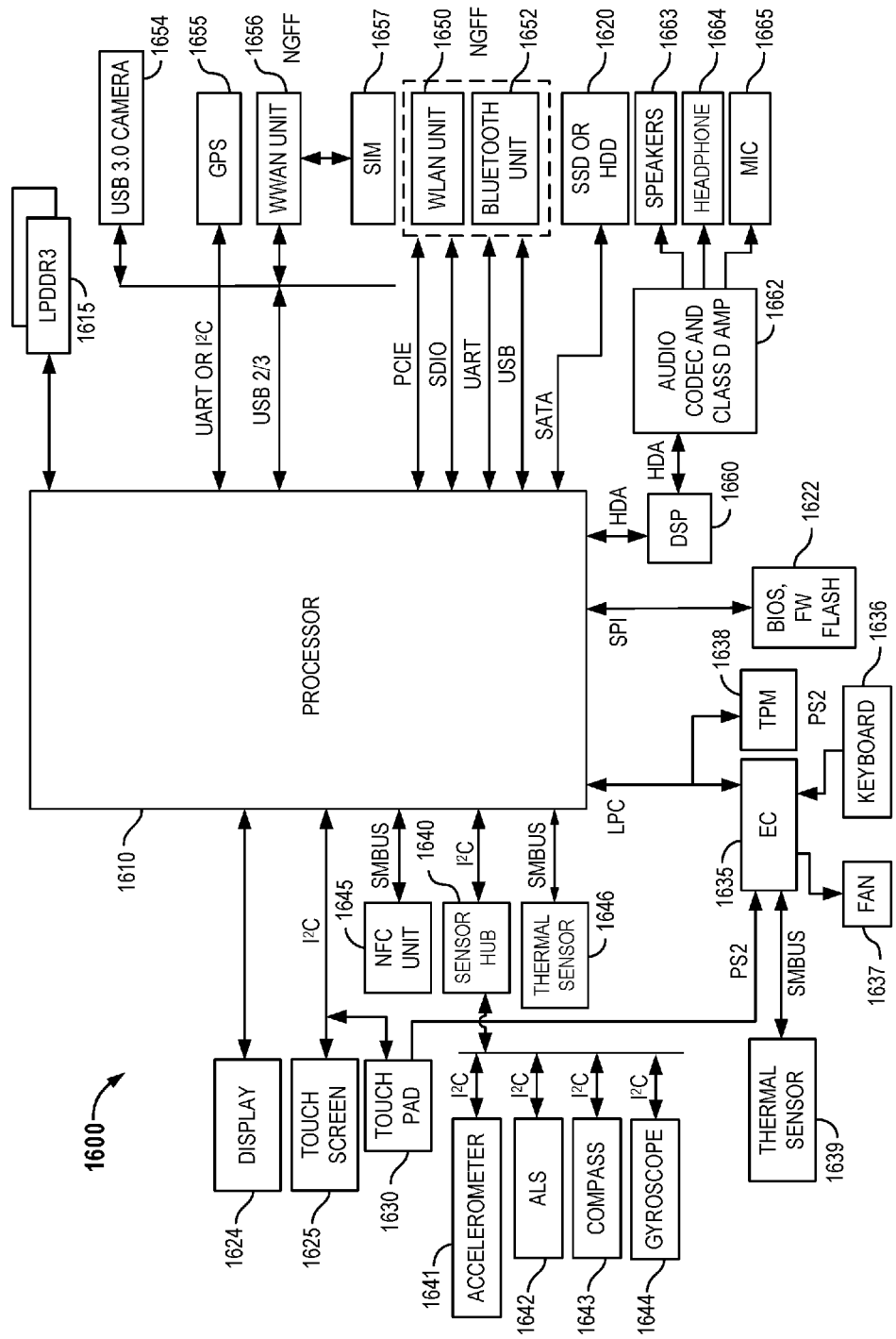
FIG. 16 illustrates an embodiment of a block diagram for a computing system.

Referring now to FIG. 16, a block diagram of components present in a computer system in accordance with embodiments of the disclosure is illustrated. As shown in FIG. 16, system 1600 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 16 is intended to show a high level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 16, a processor 1610, in one embodiment, includes a microprocessor, multi-core processor, multi-threaded processor, an ultra low voltage processor, an embedded processor, or other known processing element. In the illustrated implementation, processor 1610 acts as a main processing unit and central hub for communication with many of the various components of the system 1600. As one example, processor 1600 is implemented as a system on a chip (SoC). As a specific illustrative example, processor 1610 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1610 in one implementation will be discussed further below to provide an illustrative example.

Processor 1610, in one embodiment, communicates with a system memory 1615. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may also couple to processor 1610. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 16, a flash device 1622 may be coupled to processor 1610, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1600. Specifically shown in the embodiment of FIG. 16 is a display 1624 which may be a high definition LCD or LED panel configured within a lid portion of the chassis. This display panel may also provide for a touch screen 1625, e.g., adapted externally over the display panel such that via a user's interaction with this touch screen, user inputs can be provided to the system to enable desired operations, e.g., with regard to the display of information, accessing of information and so forth. In one embodiment, display 1624 may be coupled to processor 1610 via a display interconnect that can be implemented as a high performance graphics interconnect. Touch screen 1625 may be coupled to processor 1610 via another interconnect, which in an embodiment can be an $I^2C$ interconnect. As further shown in FIG. 16, in addition to touch screen 1625, user input by way of touch can also occur via a touch pad 1630 which may be configured within the chassis and may also be coupled to the same $I^2C$ interconnect as touch screen 1625.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080 p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1610 in different manners. Certain inertial and environmental sensors may couple to processor 1610 through a sensor hub 1640, e.g., via an I²C interconnect. In the embodiment shown in FIG. 16, these sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 16, various peripheral devices may couple to processor 1610 via a low pin count (LPC) interconnect. In the embodiment shown, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in one embodiment with processor 1610 via an SMBus. Note that via this NFC unit 1645, devices in close proximity to each other can communicate. For example, a user can enable system 1600 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 16, additional wireless units can include other short range wireless engines including a WLAN unit 1650 and a Bluetooth unit 1652. Using WLAN unit 1650, Wi-Fi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present. Note that in the embodiment shown in FIG. 16, WWAN unit 1656 and an integrated capture device such as a camera module 1654 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665 which in an embodiment can be implemented via dual array microphones (such as a digital microphone array) to provide for high quality audio inputs to enable voice-activated control of various operations within the system. Note also that audio outputs can be provided from amplifier/CODEC 1662 to a headphone jack 1664. Although shown with these particular components in the embodiment of FIG. 16, understand that the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1610 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1635. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1635 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 16, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 17:
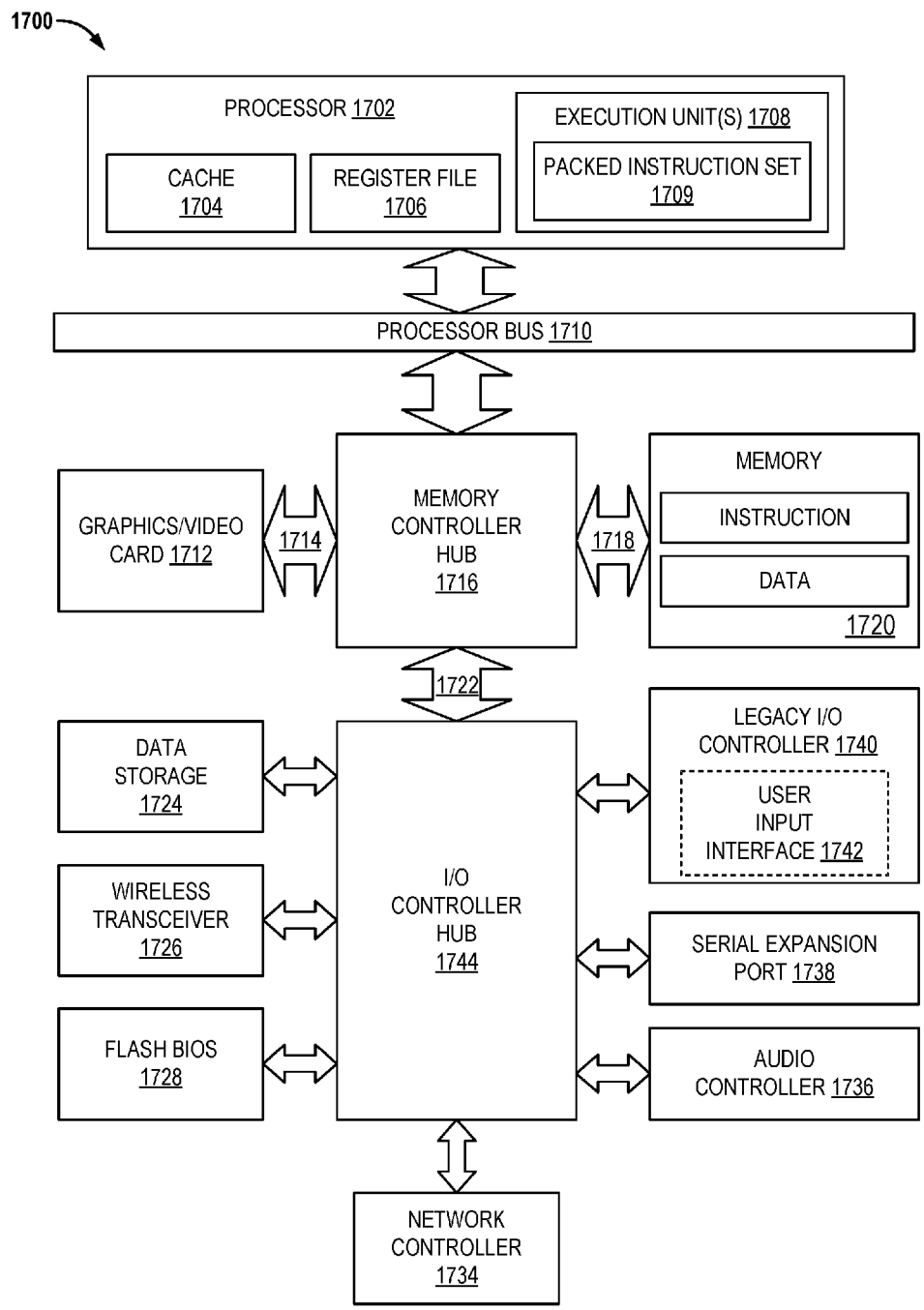
FIG. 17 illustrates another embodiment of a block diagram for a computing system.

Turning to FIG. 17, a block diagram of an exemplary computer system formed with a processor that includes execution units to execute an instruction, where one or more of the interconnects implement one or more features in accordance with embodiments of the disclosure is illustrated. System 1700 includes a component, such as a processor 1702 to employ execution units including logic to perform algorithms for process data, in accordance with the present disclosure, such as in the embodiment described herein. System 1700 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1700 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1702 includes one or more execution units 1708 to implement an algorithm that is to perform at least one instruction. One embodiment may be described in the context of a single processor desktop or server system, but alternative embodiments may be included in a multiprocessor system. System 1700 is an example of a 'hub' system architecture. The computer system 1700 includes a processor 1702 to process data signals. The processor 1702, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1702 is coupled to a processor bus 1710 that transmits data signals between the processor 1702 and other components in the system 1700. The elements of system 1700 (e.g. graphics accelerator 1712, memory controller hub 1716, memory 1720, I/O controller hub 1744, wireless transceiver 1726, Flash BIOS 1728, Network controller 1734, Audio controller 1736, Serial expansion port 1738, I/O controller 1740, etc.) perform their conventional functions that are well known to those familiar with the art.

In one embodiment, the processor 1702 includes a Level 1 (L1) internal cache memory 1704. Depending on the architecture, the processor 1702 may have a single internal cache or multiple levels of internal caches. Other embodiments include a combination of both internal and external caches depending on the particular implementation and needs. Register file 1706 is to store different types of data in various registers including integer registers, floating point registers, vector registers, banked registers, shadow registers, checkpoint registers, status registers, and instruction pointer register.

Execution unit 1708, including logic to perform integer and floating point operations, also resides in the processor 1702. The processor 1702, in one embodiment, includes a microcode (μcode) ROM to store microcode, which when executed, is to perform algorithms for certain macroinstructions or handle complex scenarios. Here, microcode is potentially updateable to handle logic bugs/fixes for processor 1702. For one embodiment, execution unit 1708 includes logic to handle a packed instruction set 1709. By including the packed instruction set 1709 in the instruction set of a general-purpose processor 1702, along with associated circuitry to execute the instructions, the operations used by many multimedia applications may be performed using packed data in a general-purpose processor 1702. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1708 may also be used in micro controllers, embedded processors, graphics devices, DSPs, and other types of logic circuits. System 1700 includes a memory 1720. Memory 1720 includes a dynamic random access memory (DRAM) device, a static random access memory (SRAM) device, flash memory device, or other memory device. Memory 1720 stores instructions and/or data represented by data signals that are to be executed by the processor 1702.

Note that any of the aforementioned features or aspects of the embodiments of the disclosure may be utilized on one or more interconnect illustrated in FIG. 17. For example, an on-die interconnect (ODI), which is not shown, for coupling internal units of processor 1702 implements one or more aspects of the disclosure herein. Or the embodiments of the disclosure are associated with a processor bus 1710 (e.g. Intel Quick Path Interconnect (QPI) or other known high performance computing interconnect), a high bandwidth memory path 1718 to memory 1720, a point-to-point link 1714 to graphics accelerator 1712 (e.g. a Peripheral Component Interconnect express (PCIe) compliant fabric), a controller hub interconnect 1722, an I/O or other interconnect (e.g. USB, PCI, PCIe) for coupling the other illustrated components. Some examples of such components include the audio controller 1736, firmware hub (flash BIOS) 1728, wireless transceiver 1726, data storage 1724, legacy I/O controller 1710 containing user input and keyboard interfaces 1742, a serial expansion port 1738 such as Universal Serial Bus (USB), and a network controller 1734. The data storage device 1724 can comprise a hard disk drive, a floppy disk drive, a CD-ROM device, a flash memory device, or other mass storage device.

Figure 18:
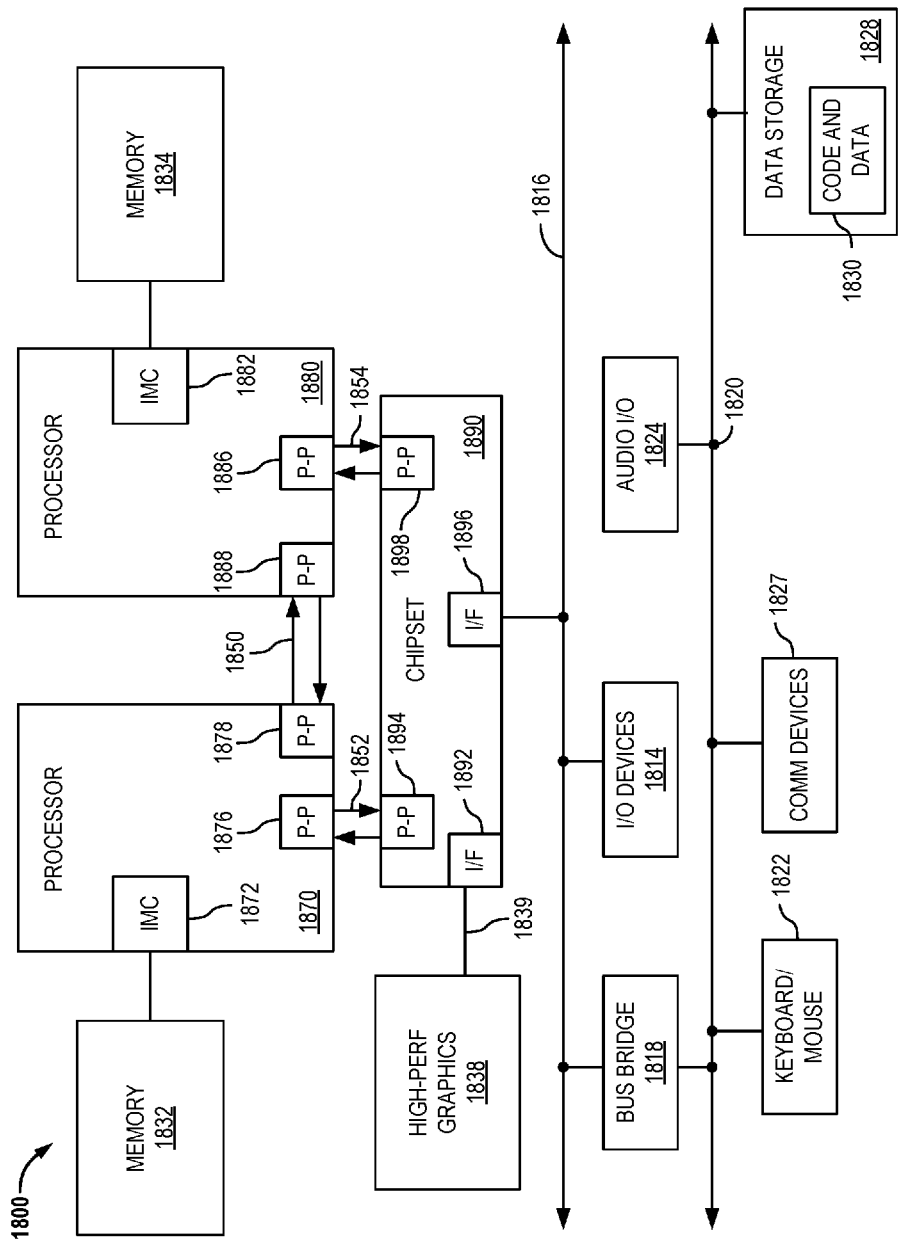
FIG. 18 illustrates another embodiment of a block diagram for a computing system.

Referring now to FIG. 18, shown is a block diagram of a second system 1800 in accordance with an embodiment of the present disclosure. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of a processor. In one embodiment, 1852 and 1854 are part of a serial, point-to-point coherent interconnect fabric, such as Intel's Quick Path Interconnect (QPI) architecture. As a result, embodiments of the disclosure may be implemented within the QPI architecture.

While shown with only two processors 1870, 1880, it is to be understood that the scope of the present disclosure is not so limited. In other embodiments, one or more additional processors may be present in a given processor.

Processors 1870 and 1880 are shown including integrated memory controller units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 each exchange information with a chipset 1890 via individual P-P interfaces 1852, 1854 using point to point interface circuits 1876, 1894, 1886, 1898. Chipset 1890 also exchanges information with a high-performance graphics circuit 1838 via an interface circuit 1892 along a high-performance graphics interconnect 1839.

A shared cache (not shown) may be included in either processor or outside of both processors; yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present disclosure is not so limited.

As shown in FIG. 18, various I/O devices 1814 are coupled to first bus 1816, along with a bus bridge 1818 which couples first bus 1816 to a second bus 1820. In one embodiment, second bus 1820 includes a low pin count (LPC) bus. Various devices are coupled to second bus 1820 including, for example, a keyboard and/or mouse 1822, communication devices 1827 and a storage unit 1828 such as a disk drive or other mass storage device which often includes instructions/code and data 1830, in one embodiment. Further, an audio I/O 1824 is shown coupled to second bus 1820. Note that other architectures are possible, where the included components and interconnect architectures vary. For example, instead of the point-to-point architecture of FIG. 18, a system may implement a multi-drop bus or other such architecture.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

What is claimed is:

1. A retimer apparatus comprising:
a receiver to receive a data block and a timestamp for the data block from an upstream device;
a buffer to store the data block and the timestamp for transmittal;
a controller to modify the timestamp to generate a modified timestamp that includes a time from a receipt of a first portion of the data block in the buffer until a transmittal of the first portion of the data block from the buffer; and
a transmitter to transmit the data block and the modified timestamp to a downstream device wherein the controller associates a second timestamp in a clock domain of the transmitter with the timestamp from the upstream device.

2. The retimer apparatus of claim 1, wherein the time from receipt of the first portion of the data block until the transmittal of the first portion of the data block is tracked in a single clock domain.

3. The retimer apparatus of claim 1, wherein the modified timestamp is a modified Isochronous Timestamp Packet.

4. The retimer apparatus of claim 1, wherein the controller is to further modify the timestamp to generate the modified timestamp that includes a Link Delay Measurement for a first link between the upstream device and the retimer apparatus.

5. The retimer apparatus of claim 1, wherein the second timestamp represents the receipt of the first portion of the data block in the clock domain of the transmitter.

6. The retimer apparatus of claim 1, wherein the second timestamp passes through the buffer with the data block and the timestamp for the data block.

7. The retimer apparatus of claim 1, further comprising a counter to track the time from receipt of the first portion of the data block until the transmittal of the first portion of the data block.

8. A method comprising:
receiving a data block and a timestamp for the data block from an upstream device with a receiver of a retimer apparatus;
associating a second timestamp in a clock domain of a transmitter of the retimer apparatus with the timestamp from the upstream device;
storing the data block and the timestamp for transmittal in a buffer of the retimer apparatus;
modifying the timestamp to generate a modified timestamp including a time from a receipt of a first portion of the data block in the buffer until a transmittal of the first portion of the data block from the buffer; and
transmitting the data block and the modified timestamp to a downstream device with the transmitter of the retimer apparatus.

9. The method of claim 8, wherein the time from receipt of the first portion of the data block until the transmittal of the first portion of the data block is tracked in a single clock domain.

10. The method of claim 8, wherein the modified timestamp is a modified Isochronous Timestamp Packet.

11. The method of claim 8, comprising further modifying the timestamp to generate the modified timestamp including a Link Delay Measurement for a first link between the upstream device and the retimer apparatus.

12. The method of claim 8, wherein the second timestamp represents the receipt of the first portion of the data block in the clock domain of the transmitter.

13. The method of claim 8, further comprising passing the second timestamp through the buffer with the data block and the timestamp for the data block.

14. The method of claim 8, further comprising tracking the time from receipt of the first portion of the data block until the transmittal of the first portion of the data block with a counter.

15. An apparatus comprising:
a hardware processor;
a host; and
a retimer apparatus comprising:
a receiver to receive a data block and a timestamp for the data block from the host;
a buffer to store the data block and the timestamp for transmittal;
a controller to modify the timestamp to generate a modified timestamp that includes a time from a receipt of a first portion of the data block in the buffer until a transmittal of the first portion of the data block from the buffer; and
a transmitter to transmit the data block and the modified timestamp to a downstream device wherein the controller associates a second timestamp in a clock domain of the transmitter with the timestamp from the host.

16. The apparatus of claim 15, wherein the time from receipt of the first portion of the data block until the transmittal of the first portion of the data block is tracked in a single clock domain.

17. The apparatus of claim 15, wherein the modified timestamp is a modified Isochronous Timestamp Packet.

18. The apparatus of claim 15, wherein the controller is to further modify the timestamp to generate the modified timestamp that includes a Link Delay Measurement for a first link between the host and the retimer apparatus.

19. The apparatus of claim 15, wherein the second timestamp represents the receipt of the first portion of the data block in the clock domain of the transmitter.

20. The apparatus of claim 15, wherein the second timestamp passes through the buffer with the data block and the timestamp for the data block.

21. The apparatus of claim 15, further comprising a counter to track the time from receipt of the first portion of the data block until the transmittal of the first portion of the data block.

22. The retimer apparatus of claim 1, wherein the receiver comprises a synchronizer to convert the second timestamp from the clock domain of the transmitter to a clock domain of the receiver.

23. The method of claim 8, further comprising converting the second timestamp from the clock domain of the transmitter to a clock domain of the receiver with a synchronizer of the receiver.

24. The apparatus of claim 15, wherein the retimer apparatus comprises a synchronizer to convert the second timestamp from the clock domain of the transmitter to a clock domain of the receiver.

* * * * *